United States Patent [19]
Mellgren, III et al.

[11] Patent Number: 6,085,126
[45] Date of Patent: Jul. 4, 2000

[54] SYSTEM AND METHOD FOR PREPARING CUSTOM DESIGNS FOR MULTIPLE TYPES OF IMPRINTABLE MEDIA

[75] Inventors: Edmund M. Mellgren, III, Inver Grove Heights; Gerald T. Mellgren, Mahtomedi, both of Minn.

[73] Assignee: St. Paul Stamp Works, Inc., St. Paul, Minn.

[21] Appl. No.: 08/975,610

[22] Filed: Nov. 21, 1997

[51] Int. Cl.[7] .................................................. G06F 17/00
[52] U.S. Cl. ......................... 700/233; 700/232; 707/506
[58] Field of Search ............................. 705/26; 702/188; 700/225, 232, 233, 235, 83

[56] References Cited

U.S. PATENT DOCUMENTS

| | | | |
|---|---|---|---|
| 4,984,733 | 1/1991 | Dunn, Jr. | 229/72 |
| 5,029,099 | 7/1991 | Goodman | 700/233 |
| 5,036,472 | 7/1991 | Buckley et al. | 700/233 |
| 5,056,029 | 10/1991 | Cannon | 364/479.03 |
| 5,235,519 | 8/1993 | Miura | 700/233 |
| 5,260,883 | 11/1993 | Wilson | 395/500.01 |
| 5,339,252 | 8/1994 | White et al. | 364/468.04 |
| 5,357,439 | 10/1994 | Matsuzaki et al. | 364/468.02 |
| 5,615,123 | 3/1997 | Davidson et al. | 700/233 |
| 5,717,597 | 2/1998 | Kara | 700/232 |
| 5,737,729 | 4/1998 | Denman | 700/232 |
| 5,870,718 | 2/1999 | Spector | 700/26 |
| 5,930,810 | 7/1999 | Farros et al. | 707/506 |

*Primary Examiner*—William Grant
*Assistant Examiner*—Kidest Bahta

[57] ABSTRACT

A system for creating and ordering custom designed imprintable media. The system includes a one or more first computers coupled to a central computer. The first computers are configured and arranged to input a type indicating one of a plurality of imprintable media, custom design information to engrave on an imprintable medium of the type input, and order information, and to display an image of the custom design to appear on the imprintable medium. Example custom design information includes text, clip-art, and size and shape of the imprintable medium. Custom designs and orders are automatically transmitted to a second computer for order processing.

16 Claims, 25 Drawing Sheets

FIG. 22

SYSTEM AND METHOD FOR PREPARING CUSTOM DESIGNS FOR MULTIPLE TYPES OF IMPRINTABLE MEDIA

FILED OF THE INVENTION

The invention generally relates to preparing designs for various types of imprintable media, and more particularly, to a system and method for preparing and ordering custom designs for multiple types of imprintable media.

BACKGROUND

Rubber stamps, engraved signs, name plates, labels, and calling cards are popular media for quickly conveying information. For example, teachers use rubber stamps to communicate a job-well-done to their students, companies provide name plates for easy identification of office occupants, and business people often leave calling cards for future reference. Such products, and other products of a similar nature, are herein referred to as "imprintable media" for ease of reference.

For a vendor of imprintable media, the costs that are associated with taking orders for customized designs may be relatively high. Such costs may be attributed to taking orders for customized products, mistakes in order entry, and rework attributable to miscommunications between the buyer and the seller. Furthermore, buyers are often presented with limited options in creating a customized imprintable medium. To further complicate matters, the actual appearance of the customized imprintable medium is often left to the buyer's imagination until the actual product is delivered to the buyer.

SUMMARY OF THE INVENTION

The present invention is generally directed to a system that provides consumers the capability to create custom designs for various types of imprintable media and provides sellers the capability to efficiently and accurately obtain orders for custom designed imprintable media.

Consistent with one aspect of the present invention, an automated method for creating and ordering,custom designed imprinted media, comprises the steps of: reading as input at a first computer a type indicating one of a plurality of imprintable media; reading as input at a first computer custom design information to engrave on an imprintable medium of the type input; displaying at the first computer, according to the type of imprintable medium, an image of the custom design information to appear on the imprintable medium; reading as input at the first computer order information; and automatically transmitting the type of imprintable medium, custom design information, and order information to a second computer.

In another aspect of the invention, a system for creating and ordering custom designed imprinted media, comprises: means for reading as input at a first computer a type indicating one of a plurality of imprintable media; means for reading as input at a first computer custom design information to engrave on an imprintable medium of the type input; means for displaying at the first computer, according to the type of imprintable medium, an image of the custom design information to appear on the imprintable medium; means for reading as input at the first computer order information; and means for automatically transmitting the type of imprintable medium, custom design information, and order information to a second computer.

Yet another aspect of the invention involves a system for creating and ordering custom designed imprinted media. The system comprises: a plurality of first programmed computers, each configured and arranged to input a type indicating one of a plurality of imprintable media, custom design information to engrave on an imprintable medium of the type input, and order information, and display an image of the custom design information to appear on the imprintable medium; a plurality of monitors coupled to the plurality of first computers, each for displaying an image from one of the first computers; a second programmed computer coupled to the plurality of first programmed computers and configured and arranged to download the custom design information and order information from the first programmed computer.

A kiosk for custom designing and ordering imprinted media is another aspect of the invention, where the kiosk comprises: a programmed computer; a monitor coupled to the computer; a touchscreen controller coupled to the computer; and a touchscreen coupled to the touchscreen controller and having a transparent portion through which the monitor is visible. In one embodiment, the touchscreen includes a keyboard portion, and in another embodiment, a separate keyboard is coupled to the computer.

The above summary of the present invention is not intended to provide an overview of each illustrated embodiment of the present invention. From the figures and the detailed description which follow, other advantages and aspects of the present invention will become apparent.

BRIEF DESCRIPTION OF THE DRAWINGS

The invention may be more completely understood in consideration of the detailed ion of various embodiments of the invention which follows in connection with the accompanying drawings, in which:

FIG. 22 is an image of an example user interface screen for verifying order information for customized imprintable media;

Figure 1:
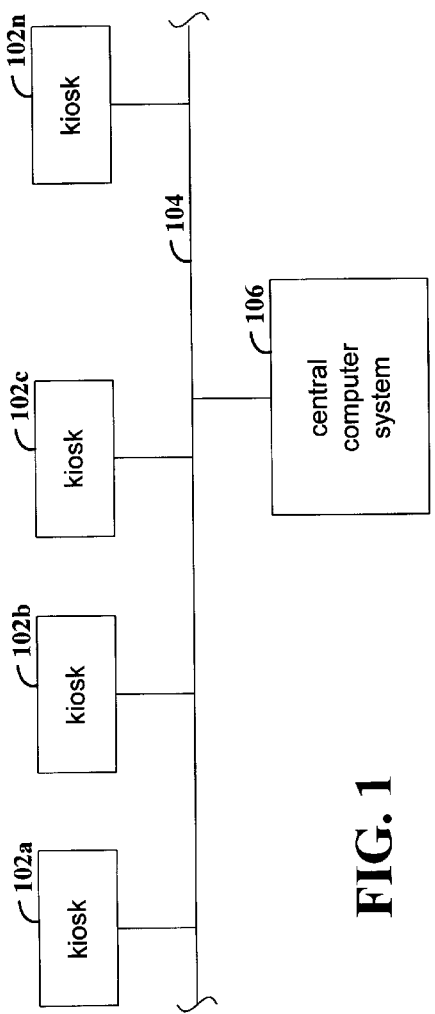
FIG. 1 is a functional block diagram of an example environment in which the present invention can be used.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

The present invention is believed to be applicable to a variety of systems and arrangements for consumers to custom design imprintable media such as rubber stamps, signs and name plates, labels and calling cards. The invention has been found to be particularly advantageous in an application environment where a plurality of kiosks are coupled to a central computer system, the kiosks being available for consumers to create custom designs and order products. While the present invention is not so limited, an appreciation of various aspects of the invention is best gained through a discussion of application examples operating in such an environment.

FIG. 1 is a functional block diagram of an example environment in which the present invention can be used. The environment includes a plurality of kiosks 102a, 102b, 102c, . . . 102n coupled to a communications network 104. A central computer system 106 is also coupled to network 104. The kiosks 102a–n provide stations having a user interface for consumers to create custom designs for stamps, signs and name plates, labels, and calling cards. The term "imprintable medium" is used in the description to refer to stamps, signs and name plates, labels, and calling cards. Even though each of the aforementioned media are not imprintable as the term imprintable is commonly used, the media are referred to as such as a matter of convenience. The term "imprintable media" as used herein is intended to also encompass products that are engraved with custom designs, such as rubber stamps, in addition to products having custom printed designs, such as labels.

The kiosks 102a–n and central computer system 106 have modems for coupling to network 104. Computer system 106 interfaces with kiosks 102a–n when design and order information is transmitted from the kiosks to the central computer system. Central computer system 106 may also interface with kiosks 102a–n for the purpose of updating various configuration files in the kiosks. In an example embodiment, central computer system 106 may be a system having a Pentium II based processor and 128 Mbytes of RAM.

Figure 2:
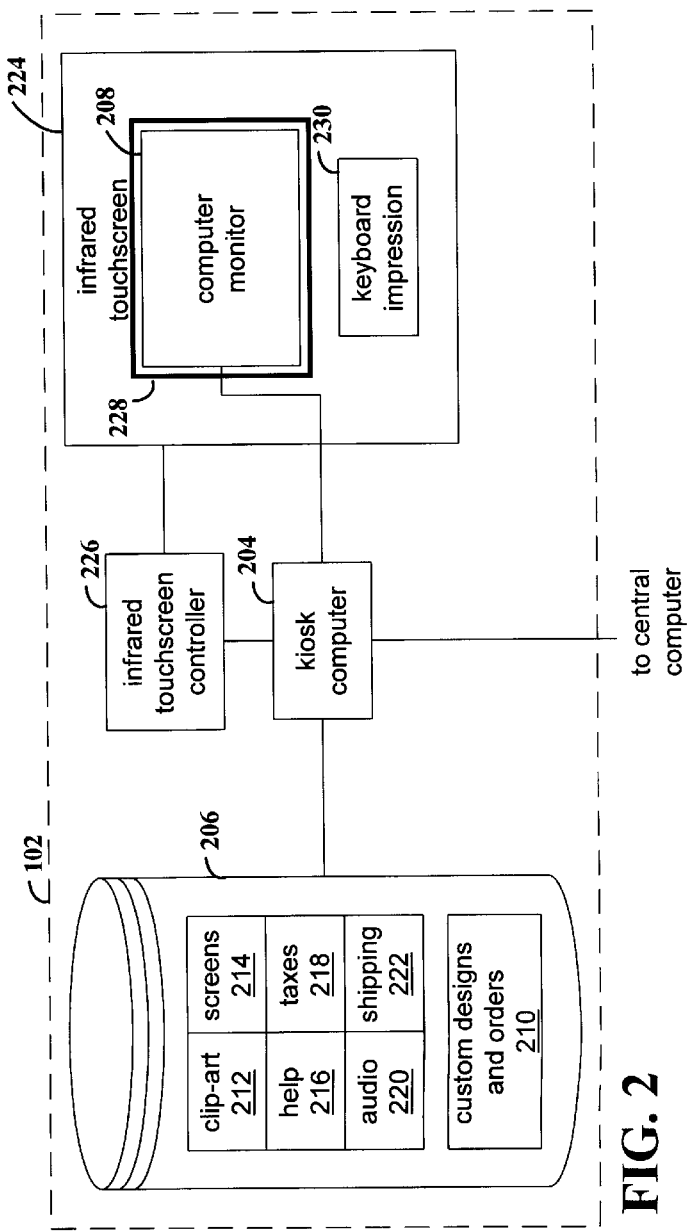
FIG. 2 is a functional block diagram of an example kiosk.

FIG. 2 is a functional block diagram of an example kiosk 102. Operation of kiosk 102 is controlled by kiosk computer 204 which is coupled to storage medium 206 and computer monitor 208. The example storage medium 206 is a magnetic disc which is used for storage of custom designs and orders in files 210, as well as programs (not shown) that cause kiosk computer 204 to operate as described herein. The files 210 having custom designs and orders are those created by consumers using the kiosk 102. The storage medium 206 also includes clip-art files 212 having clip-art images available for creation of custom designs, user interface screen files 214, help files 216, tax files 218 for computation of the proper tax for an order, audio files 220 for assisting consumers in operation of the kiosk, and shipping files 222 having price information for shipping orders to various destinations. Computer monitor 208 is coupled to kiosk computer 204 as part of the overall user interface for creating a custom design for an imprintable medium.

The example user interface includes an infrared touchscreen 224. Infrared touchscreen 224 is controlled by infrared touchscreen controller 226 which is coupled to kiosk computer 204. Both infrared touchscreen 224 and touchscreen controller 226 are commercially available from Compu Shop, Inc. Other types of touchscreens may be suitable, depending upon design requirements, such as cost, size, durability, as well as a myriad of other factors. Infrared touchscreen 224 includes monitor window 228 and keyboard impression 230. Monitor window 228 is an optically transparent material, such as acrylic, through which computer monitor 208 may be viewed. Keyboard impression 230 is a painted replication of a computer keyboard.

User interface options are displayed on monitor 208 and viewable through monitor window 228. To input data to the kiosk computer 204, the user may touch areas of touchscreen 224 within monitor window 228 and/or keyboard impression, depending upon the solicited input. Custom design and order information is read as input by kiosk computer 204 from infrared touchscreen 224 via infrared touchscreen controller 226. In an example embodiment, kiosk computer 204 includes a Pentium Pro processor and 64 Mbytes of RAM with the Windows NT 4.0 operating system.

In another example embodiment, the functions provided by the kiosk computer 204 may be provided by a network appliance or personal computer coupled to the World Wide Web (WWW), where a computer system, such as computer system 106, for example, hosts a WWW site. Such a WWW site may contain the design files 212–222 in the form of HyperText Markup Language (HTML) pages or downloadable programs such as Java applets, for example.

Figure 3:
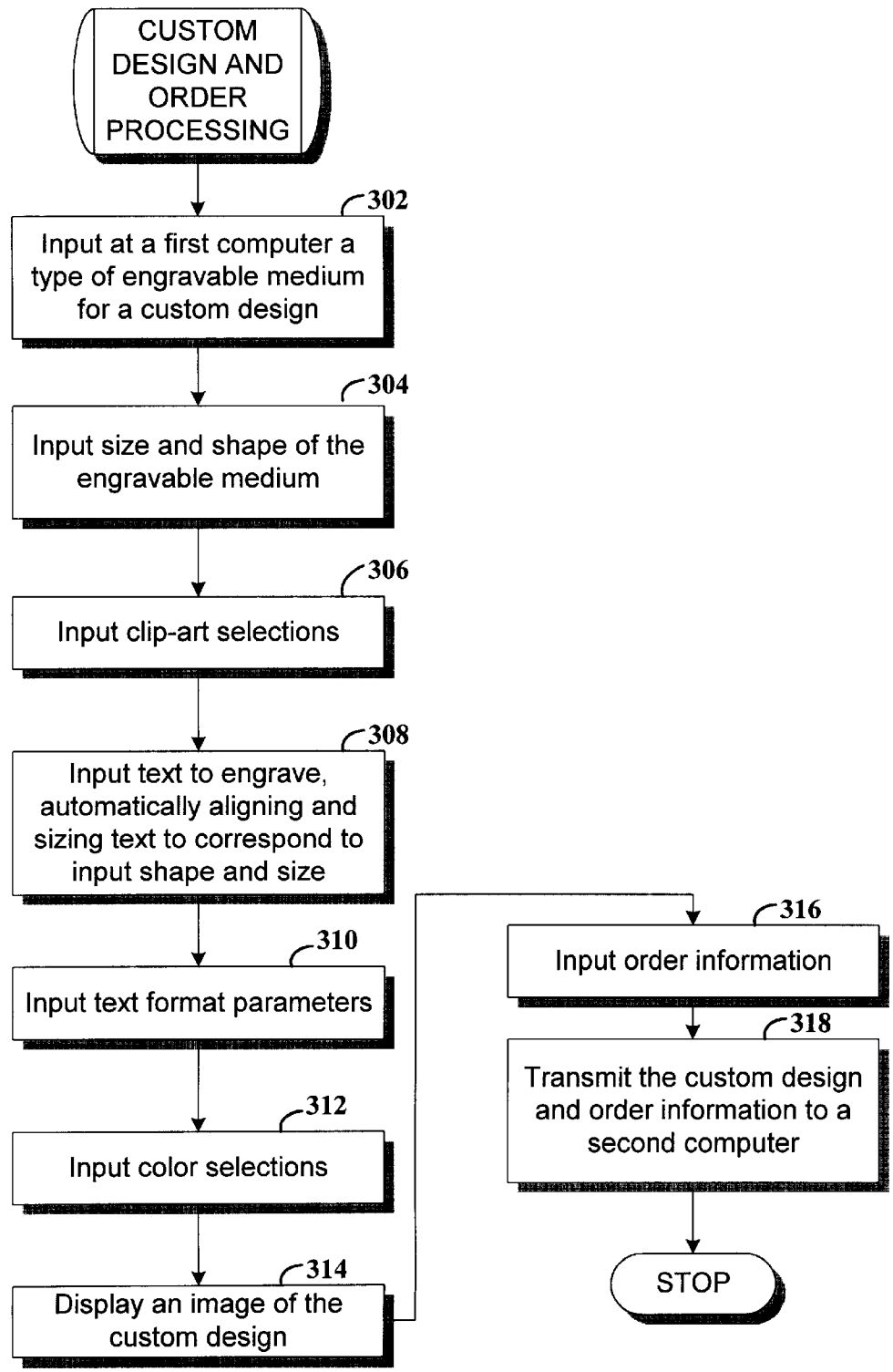
FIG. 3 is a flowchart of an example method for custom design and automated ordering of imprintable media.

FIG. 3 is a flowchart of an example method for custom design and automated ordering of imprintable media. The method involves creating a custom design at a kiosk 102 and transmitting the custom design information into central computer system 106. At step 302, kiosk computer 204 reads user input that specifies a type of imprintable medium that is desired. Example types of imprintable media include rubber stamps, signs and name plates, labels, and calling cards, as well as other types of media for which custom designs are desirable. The type entered by the consumer specifies one of a plurality of imprintable media. The invention allows vendors to efficiently solicit orders from customers or multiple types of imprintable media from a single kiosk 102. In addition, consumers can create custom designs for multiple types of imprintable media at a conveniently placed kiosk 102.

Processing continues at step 304 where kiosk computer 204 reads user input of size and shape specifications (represented as size and shape codes, for example) for the imprintable medium. This allows the consumer to custom design the size and shape of the imprintable medium. At step 306, kiosk computer 204 reads user input of clip-art selections (for example, as referenced by image codes). Kiosk computer 204 presents images in clip-art files 212 on computer monitor 208 for selection by the user. At step 308, kiosk computer 204 reads user input of text (represented as text codes for example to engrave on the imprintable medium. In reading the text, kiosk computer 204 automatically aligns and sizes the text to correspond to the input shape and size specified by the user. Thus, the user does not have to determine by trial and error an appropriate size and alignment for the input text relative to the selected type, size, and shape of imprintable medium. After the text has been automatically aligned and sized by kiosk computer 204 at step 310, the user may select different formatting to apply to the text, such as underlining, boldness, line positions, and types of fonts. User input of text format parameters are read by kiosk computer 204 at step 310. Kiosk computer 204 reads user input of color selections, at step 312, to apply to the imprintable medium. Example color selections include, but are not limited to, a color for a rubber stamp, foreground and background colors for signs and name plates, foreground and background colors for labels, and colors for images and text on calling cards. At step 314, kiosk computer 204 displays an image of the custom design of the imprintable medium. While shown only as a single step for displaying an image, it should be understood that kiosk computer 204 displays the image of the custom design as it is being developed, for example, after selection of a size and shape after step 304, after selection of a clip-art image at step 306, and after selection of colors at step 308.

Kiosk computer 204 reads user input order information at step 316. Such order information includes quantity, shipping address information, and payment method. The custom design and order information is stored in one of custom designs and order files 210. In the example embodiment, central computer system 106 establishes communication with kiosk 102 via modem. Under control of central computer system 106, the custom design and order information (for example, the codes is transmitted from kiosk 102 to central computer system 106, as shown by step 318. The vendor may then submit the order information to its manufacturing operation.

Figure 4:
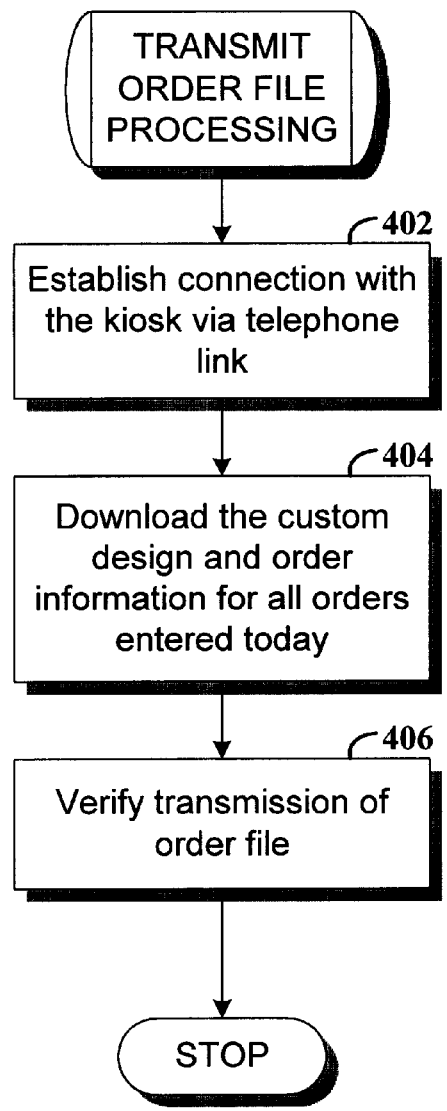
FIG. 4 is a flowchart of an example method for transmitting custom designs and order information to a vendor.

FIG. 4 is a flowchart of an example method for transmitting custom designs and order information to a vendor. At step 402, central computer system 106 establishes communications with kiosk 102 via network 104. Modems and software such as PCAnywhere from Symantec may be used, for example, to establish such communication. Central computer system 106 then downloads the custom design and order files from kiosk 102 to its central storage (not shown). Custom designs and orders in files 210 are accumulated on a daily basis at kiosk 102, and all orders for a day are downloaded by central computer system 106. At step 406 central computer system 106 verifies transmission of the custom design and order files. Verification is accomplished by transmitting the file twice and comparing the transmitted files, for example.

Figure 5:
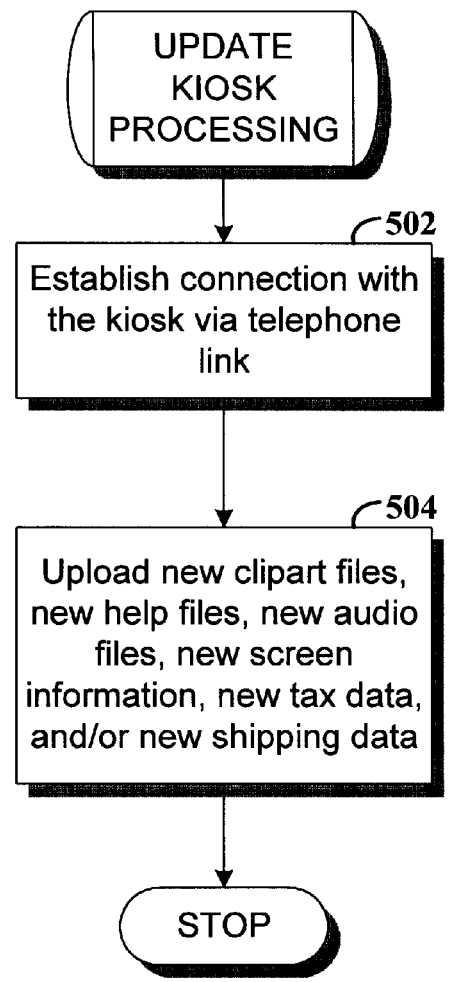
FIG. 5 is a flowchart of an example method for updating operations files of a kiosk computer.

FIG. 5 is a flowchart of an example method for updating operations files of kiosk computer 204. At step 502, central computer system 106 establishes communications with kiosk 102 via network 104. Various operations files of kiosk computer 204 may be updated by central computer system 106. Such operating parameters include clip-art files 212, user interface screen files 214, help files 216, tax files 218, audio files 220, and shipping files 222.

Figure 6:
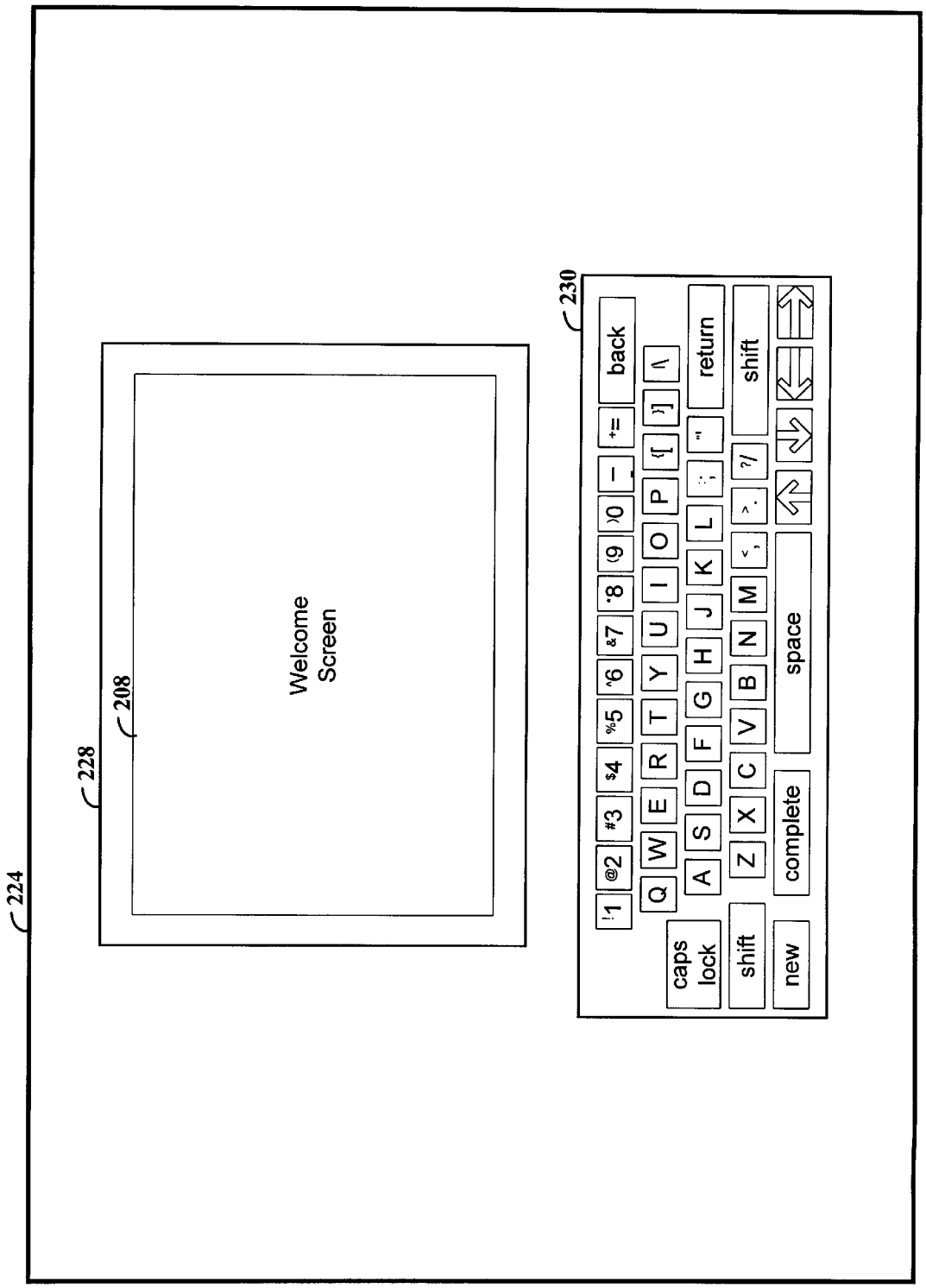
FIG. 6 is a pictorial diagram of an example infrared touchscreen.

FIG. 6 is a pictorial diagram of an example infrared touchscreen. For the purposes of the present invention, touchscreen 224 includes monitor window 228 and keyboard impression 230. Monitor window 228 is a clear material through which computer monitor 208 may be viewed. An example informational screen is displayed on computer monitor 208. Keyboard impression 230 is an image of a keyboard viewable on the surface of infrared touchscreen 224. The organization of keys on keyboard impression 230 is similar to that of a conventional computer keyboard. However, keyboard impression 230 is larger than a conventional keyboard so that infrared touchscreen controller 226 can discern when different key impressions have been touched. Keyboard impression 230 and monitor 208 are the means by which user input is solicited to generate a custom design for an imprintable medium. Creation of a custom design for an imprintable medium may be initiated, for example, by touching infrared touchscreen 224.

Figure 7:
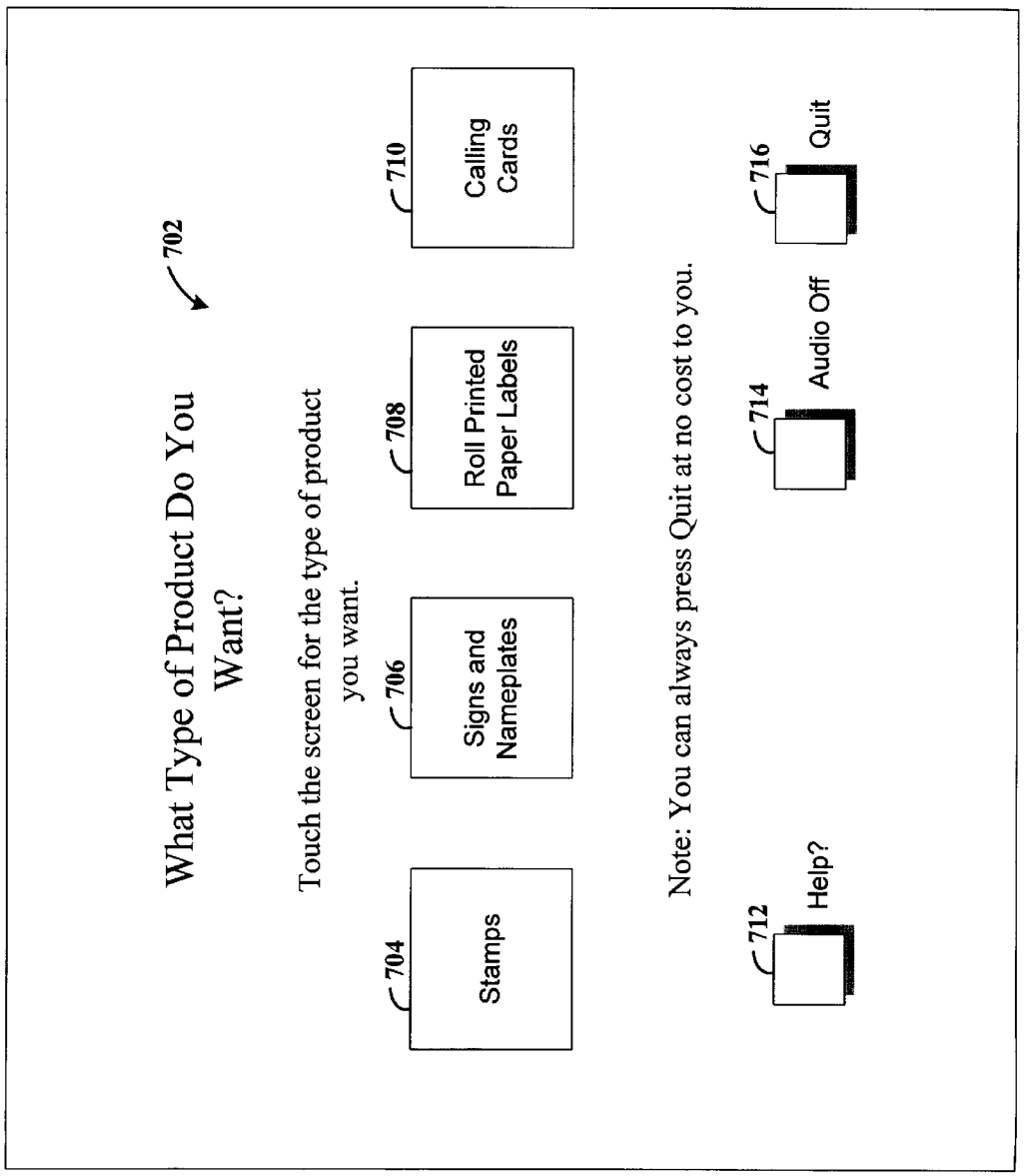
FIG. 7 is an image of an example introductory screen.

FIG. 7 is an image of an example introductory screen displayed on monitor 208 for soliciting a type of imprintable medium. Screen 702 presents for the user choices of rubber stamps, signs and name plates, labels, and calling cards. To input a selection of a type of imprintable medium, the user must touch an area of touchscreen 224 in which the desired type of imprintable medium is displayed. For example, to select a rubber stamp type, the user much touch area 704. Similarly, signs and name plates are selected by touching area 706, labels are selected by touching area 708, and calling cards are selected by touching area 710. By touching the area of the touchscreen 224 for the desired type of imprintable medium, kiosk computer 204 responds by displaying another user interface screen on monitor 208, the subsequent user interface screen being dependent upon the type of imprintable medium selected.

Additional control buttons are displayed on monitor 208 by kiosk computer 204 for controlling the process of creating a custom design. The control buttons include help button 712, audio button 714, and quit button 716. Touching the area of touchscreen 224 indicated by help button 712 results in kiosk computer 204 displaying context sensitive help. For convenience, the discussion will refer to "touching an area" or "touching a button" rather than "touching an area of touchscreen 224 indicated by a button." Audio-off button 714 may be touched if the user does not desire audible instructions or assistance in developing the custom design. The user may quit generating a custom design at any time during the process by touching quit button 716.

The example processes and screens for creating the different types of imprintable media such as stamps, signs and name plates, labels, and calling cards, are sufficiently similar such that a description of the example process and screens for creating customized rubber stamps will be discussed in the figures which follow.

Figure 8:
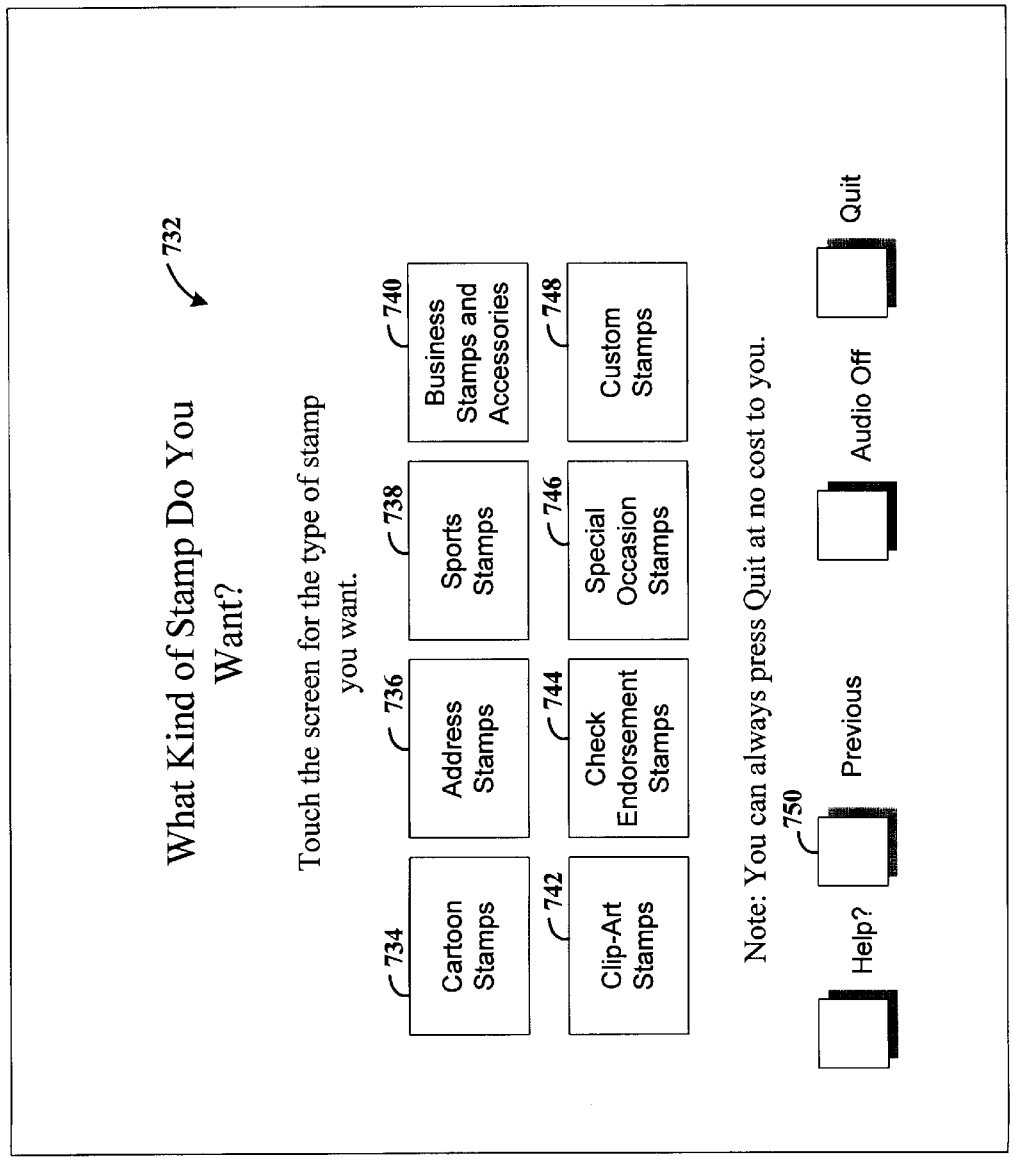
FIG. 8 is an image of an example user interface screen for beginning creation of a custom design for a rubber stamp.

FIG. 8 is an image of an example user interface screen for beginning creation of a custom design for a rubber stamp. A user can initiate the process for creating a custom design for a rubber stamp by selecting one of multiple categories of types of custom designs. Categories of custom designs for rubber stamps in the example embodiment include cartoon stamps as indicated by area 734, address stamps as indicated by area 736, sports stamps as indicated by area 738, business stamps and accessories as indicated by area 740, clip-art stamps as indicated by area 742, check endorsement stamps as indicated by area 744, special occasion stamps as indicated by area 746 and custom stamps as indicated by area 748. To select a category of types of custom designs for a rubber stamp, a user touches an area of touchscreen 224 on which the category is displayed. For example, to begin creation of a custom design for an address stamp, the user must touch area 736. In response, kiosk computer 204 displays the screen of FIG. 9 for user selection of a size or an address stamp. Previous button 750 is available for the user to return to user interface screen 702 of FIG. 7.

Figure 9:
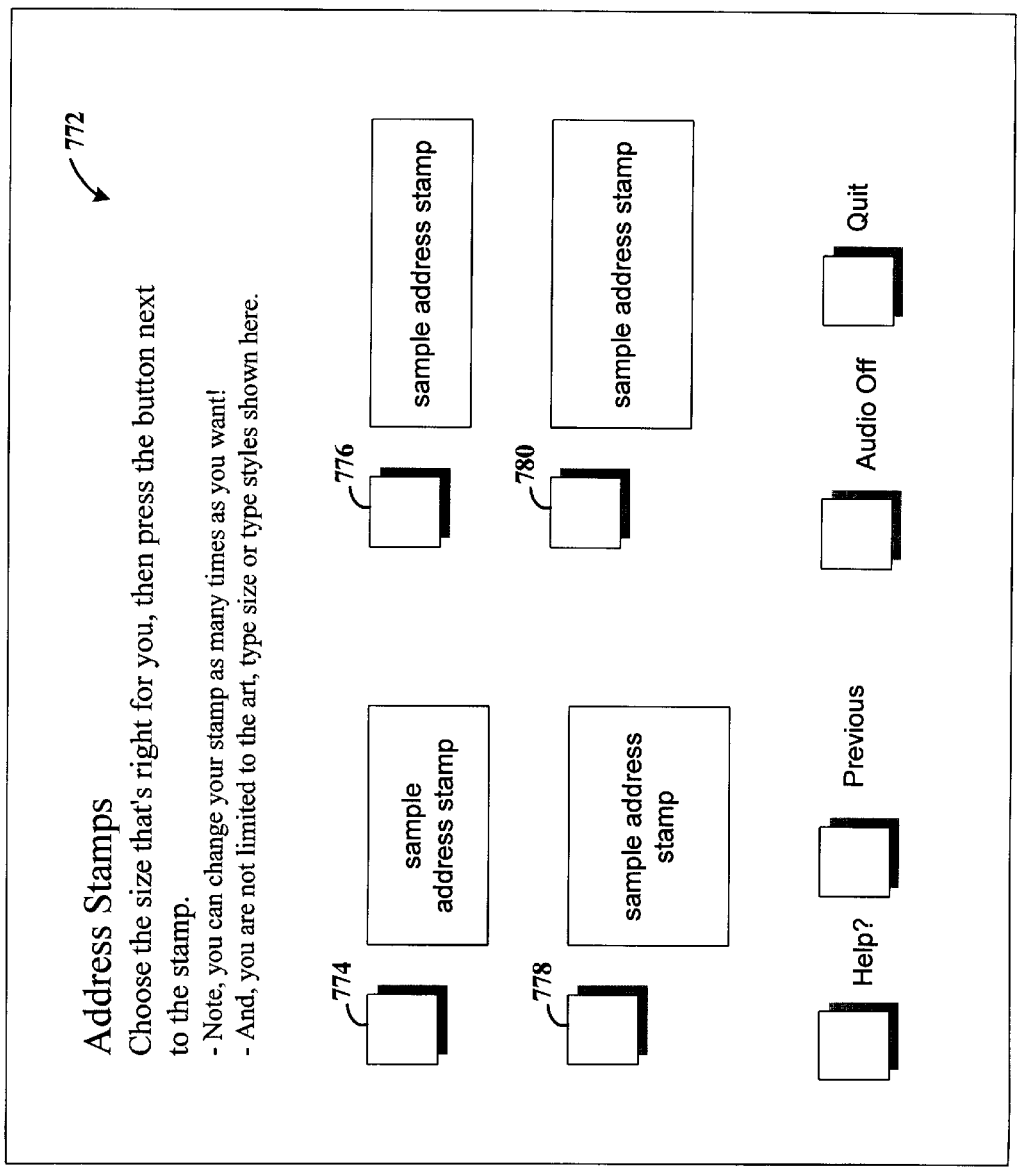
FIG. 9 is an image of an example user interface screen for user selection of a size for a customized address stamp.

FIG. 9 is an image of an example user interface screen 772 for user selection of a size for a customized address stamp. A user may select from four sizes of address stamps as indicated by buttons 774, 776, 778 and 780. A desired size is selected by touching one of respective buttons 774–780. Note that the sizes indicated by buttons 776 and 780 are sufficiently wide enough for a user to select a clip-art image to include in the customized address stamp. Touching any of buttons 774–780 causes kiosk computer 204 to display a clip-art decision screen of FIG. 10.

Figure 10:
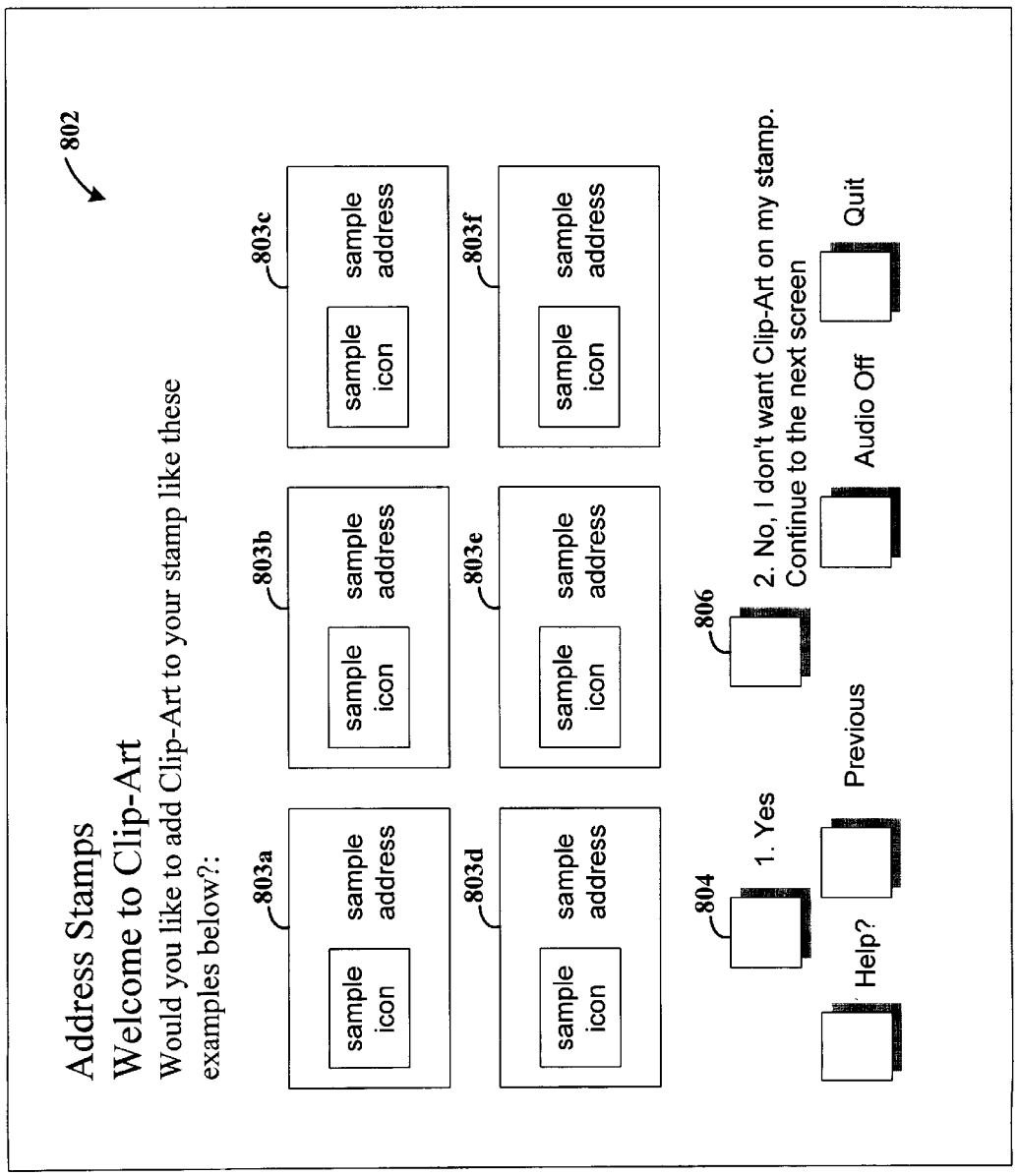
FIG. 10 is an image of an example clipart decision screen for a user to indicate whether clipart is desired for a customized address stamp.
Figure 11:
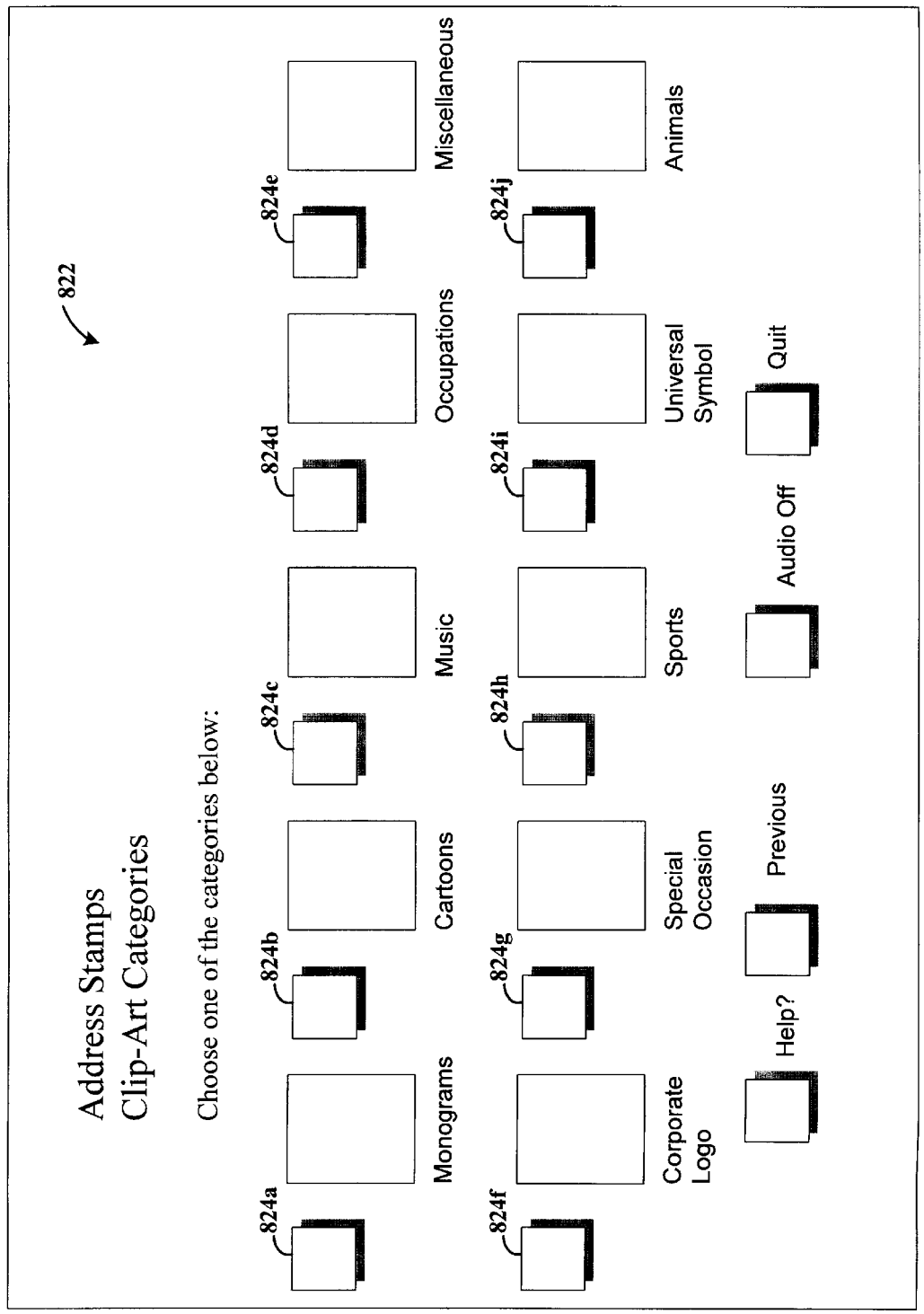
FIG. 11 is an image of an example user interface screen for selecting a category of clipart images.

FIG. 10 is an image of a clip-art decision screen 802 for a user to indicate whether clip-art is desired for a customized address stamp. Screen 802 includes example address stamp images 803a, 803b, 803c, 803d, 803e, and 803f for illustrating to a user various types of clip-art that may be added to a customized address stamp. Screen 802 also includes yes button 804 and no button 806. To add a clip-art image to the customized design, the user must touch yes button 804. Otherwise, if no clip-art is desired, then the user must touch no button 806. Touching yes button 804 causes kiosk computer 204 to display a user interface screen for selecting a clip-art image as shown in FIG. 11. If the no button 806 is touched, kiosk computer 204 displays the user interface screen for entry of address text as shown in FIG. 13.

Continuing now with FIG. 11, an image of a user interface screen for selecting a category of clip-art images is shown. Screen 822 includes category selection buttons 824a, 824b, 824c, 824d, 824e, 824f, 82g, 824h, 824i and 824j. Each of buttons 824a–j is made available for a user to select from the categories of monograms, cartoons, music, occupations, miscellaneous clip-art, corporate logos, special occasions, sports, universal symbols, and animals. Boxes associated with buttons 824a–j contain example clip-art images (not shown) taken from each of the categories. Selection of a category of clip-art images causes kiosk computer 204 display clip-art images from clipart files 212 according to the selected category. Note that kiosk computer 204 may be programmed to restrict access to a proprietary clip-art category such as corporate logos. As an example, the following screens assume selection of the monograms category as indicated by button 824a.

Figure 12:
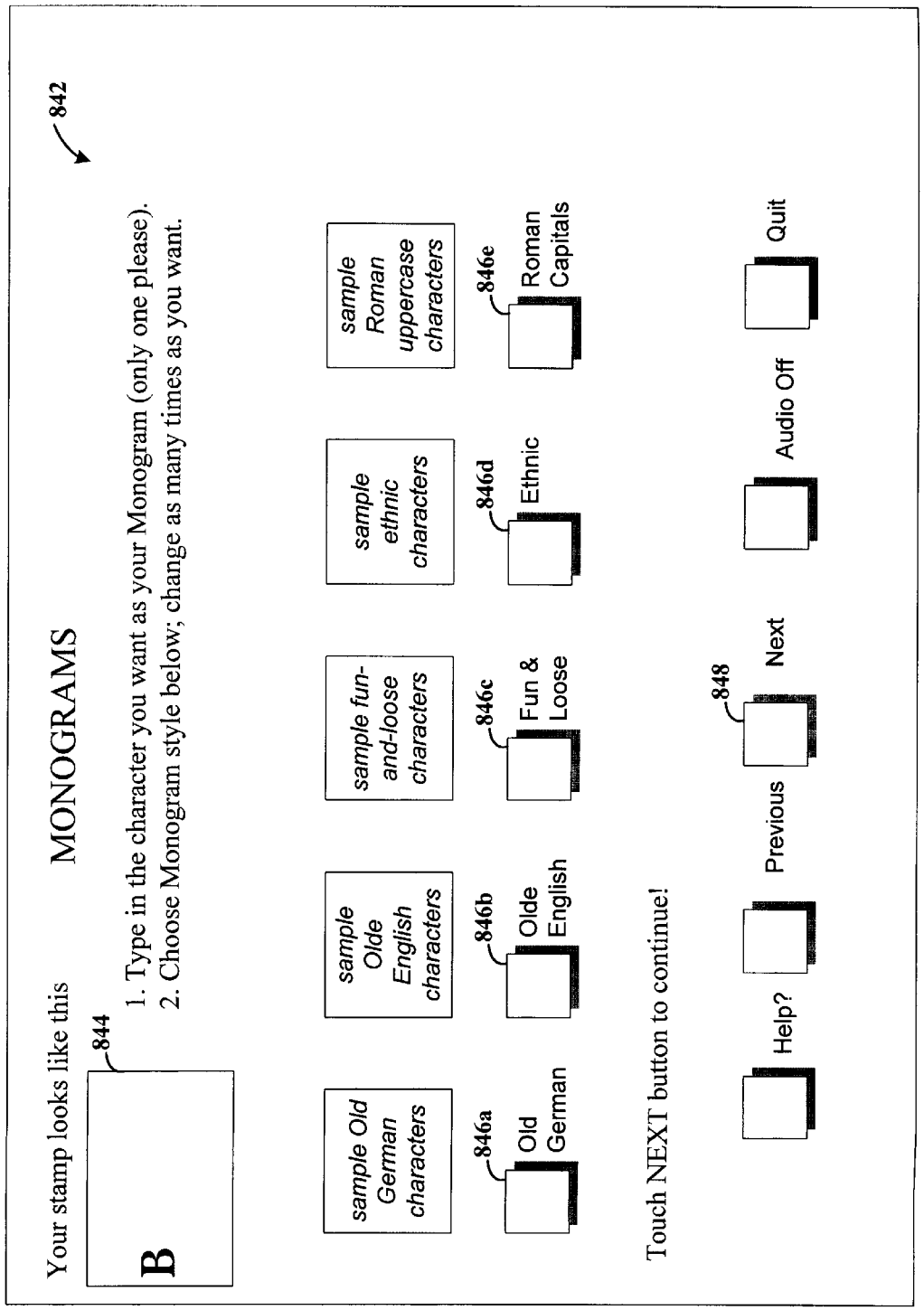
FIG. 12 is an image of an example user interface screen for user specification of a monogram to include on a customized address stamp.

FIG. 12 is an image of an example user interface screen for user specification of a monogram to include on a customized address stamp. As indicated by the instructions on the screen 842, a user first enters, via keyboard impression 230, the character to be used as the monogram. In this example, the user entered the character B. Image 844 is a what-you-see-is-what-you-get (WYSIWYG) type image of the custom address stamp, thereby permitting the user to tailor the design as it is being developed at the kiosk 102. After entering a monogram character, a user may select a style for the monogram character as indicated by buttons 846a, 846b, 846c, 846d, and 846e. In the example, the Old German style text has been selected. To continue creation of a custom design for an address stamp, the user must touch next button 848. Touching the next button 848 causes kiosk computer 204 to present the user interface screen for entering custom address information as shown by FIG. 13.

Figure 13:
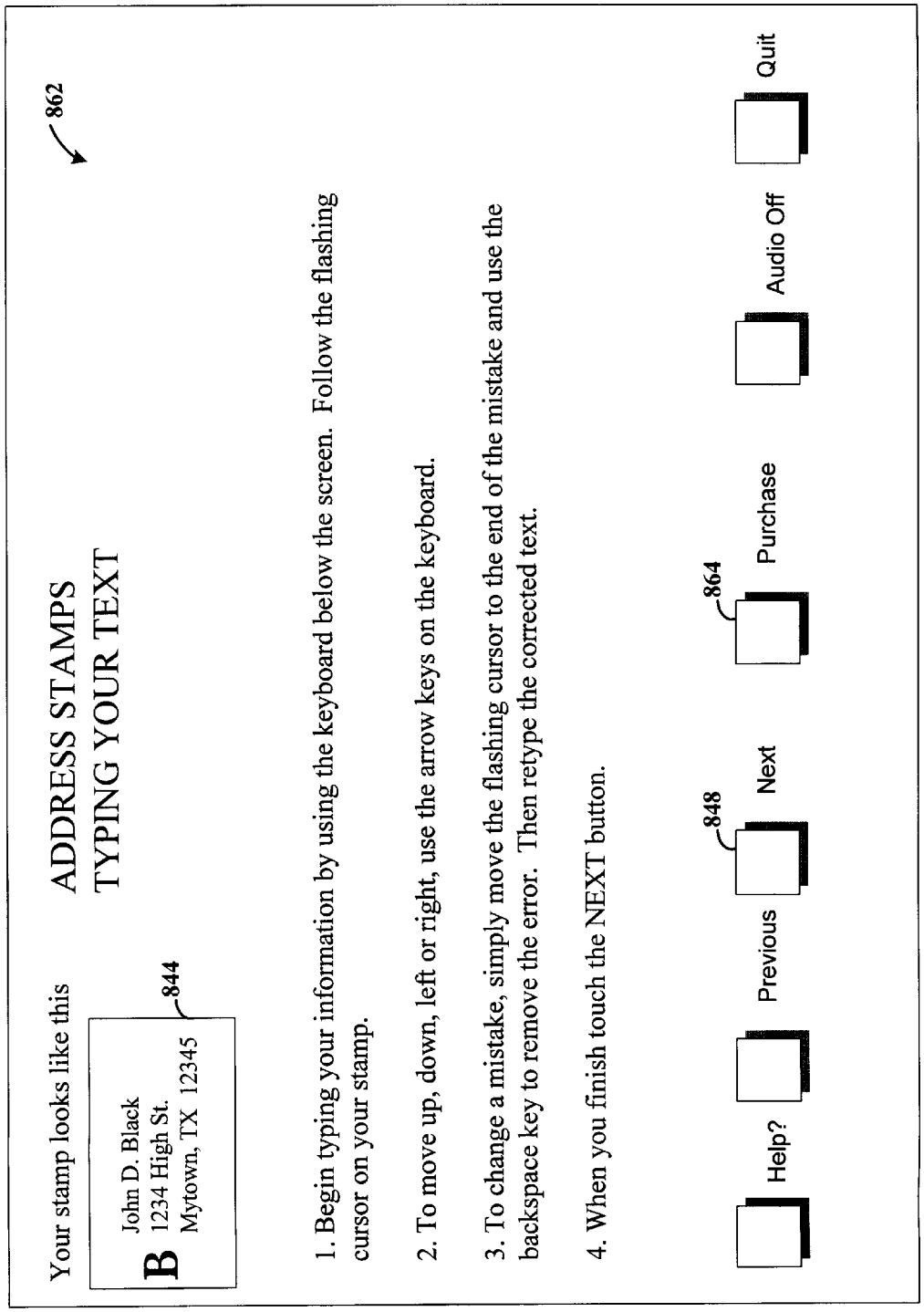
FIG. 13 is an image of an example user interface screen for entry of address text or an address stamp.
Figure 14:
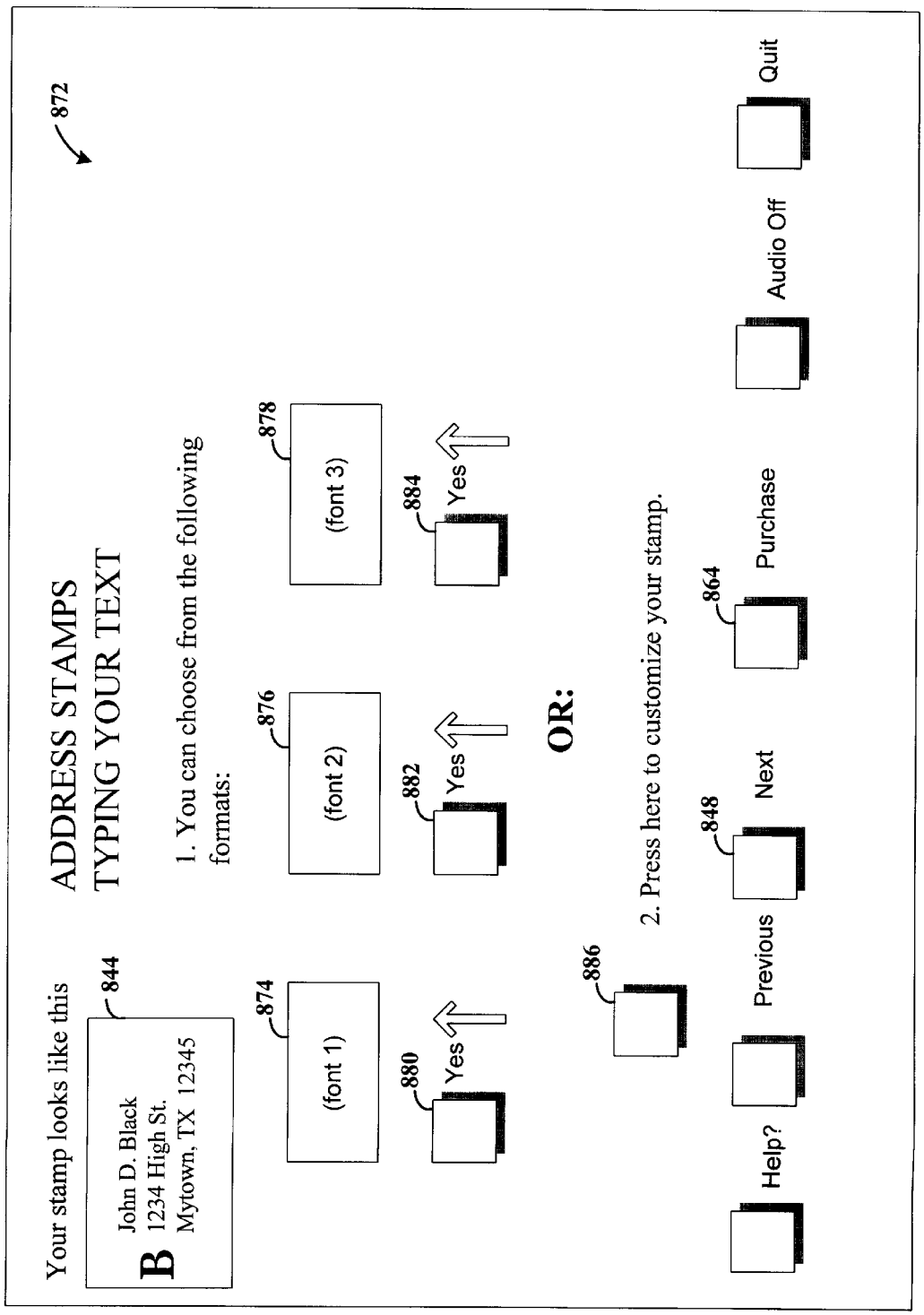
FIG. 14 is an image of an example user interface screen for further formatting of a customized address stamp.

FIG. 13 is an image of an example user interface screen for entry of address text for an address stamp. As the user enters address information at keyboard impression 230, kiosk computer 204 displays the address information in image box 844 on monitor 228 which is viewable through the touchscreen 224. As indicated by instructions 1, 2, and 3, conventional word processing techniques are used for entering address information. When the user finishes entering address information, the next button 848 must be pressed to continue creating the customized address stamp. Touching button 848 causes kiosk computer 204 to display a user interface screen for selection of further formatting of the address stamp as shown in FIG. 14. Alternatively, the user may touch purchase button 864 to proceed to the purchase screen of FIG. 21.

FIG. 14 is an image of an example user interface screen for further formatting a customized address stamp. The user may select from one of three standard formats as illustrated by boxes 874, 876, and 878, or may choose option 2 for further customization of the address information. Three different standard fonts are available for the address text as indicated by "Font 1," "Font 2," and "Font 3" as shown in boxes 874–878. Yes buttons 880, 882 and 884 are respectively associated with image boxes 874, 876, and 878. To select a desired standard format, the user must touch one of yes buttons 880, 882, 884. To customize the address text, the user must touch button 886. If the user selects one of the standard formats of boxes 874, 876, and 878, kiosk computer 204 presents the purchase screen of FIG. 21 when the user pushes the next button 848. If the user elects to customize the address text by touching button 886 and then touching next button 848, kiosk computer 204 displays the user interface screen for further customization of the address text as illustrated by FIG. 15.

Figure 15:
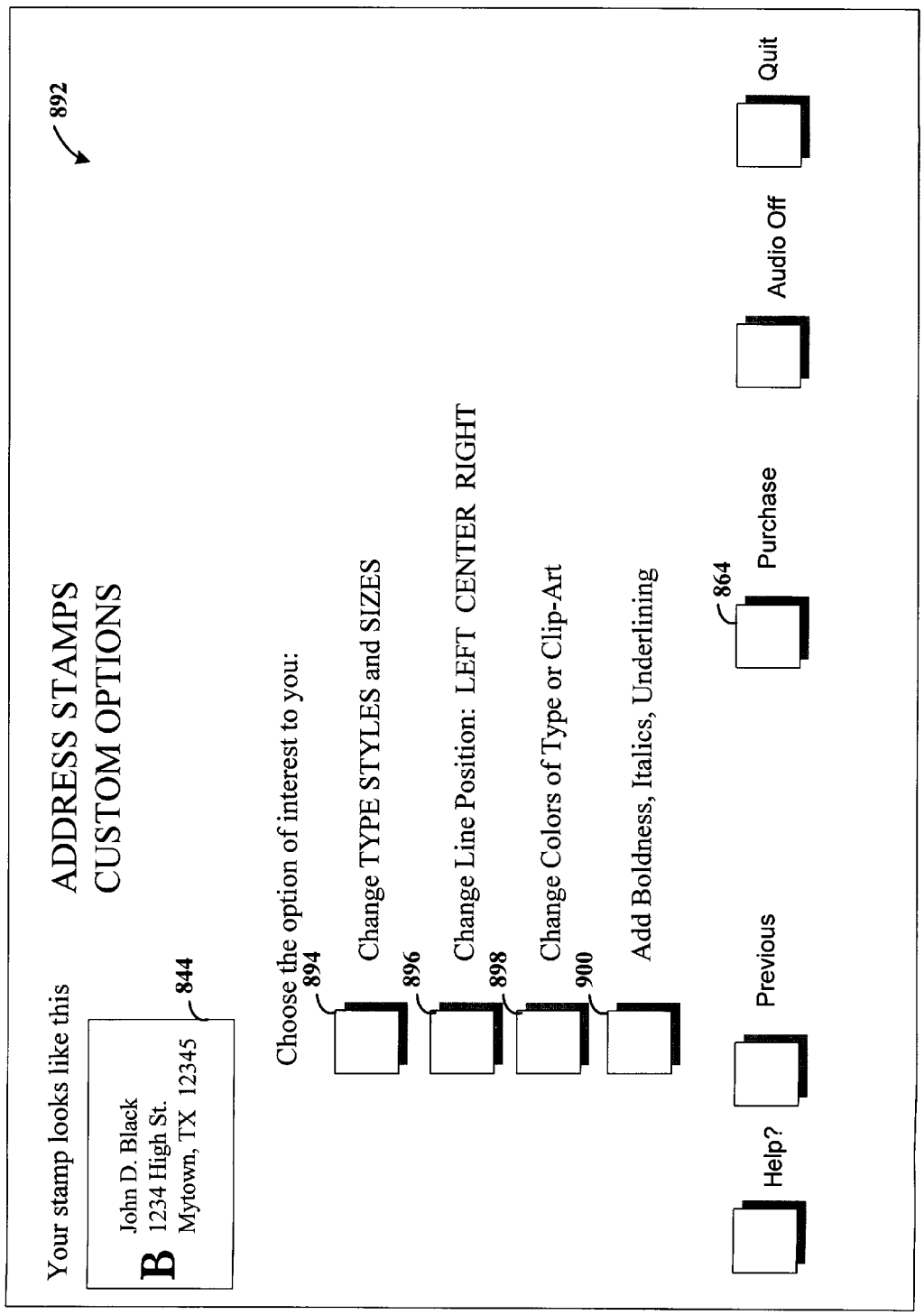
FIG. 15 is an image of an example user interface screen for selecting further custom options for an address stamp.

FIG. 15 is an image of an example user interface screen for selecting further customization options for an address stamp. In screen 892, the user may select changes to type styles and sizes, line positions, colors of text or clip-art, and boldness, italics, and underlining of the address text. A different user interface screen is presented to the user depending upon which of buttons 894, 896, 898 or 900 the user touches. If the user touches button 894, a user interface screen for changing type styles and sizes is presented; if the user touches button 896, a user interface screen for changing line positions is displayed,; if the user touches button 898, a user interface screen for changing colors of type or clip-art is displayed, and if the user touches button 900, a user interface screen for adding boldness, italics, or underlining is displayed for the user. The following FIGS. illustrate screen images for each of the aforementioned customization options.

Figure 16:
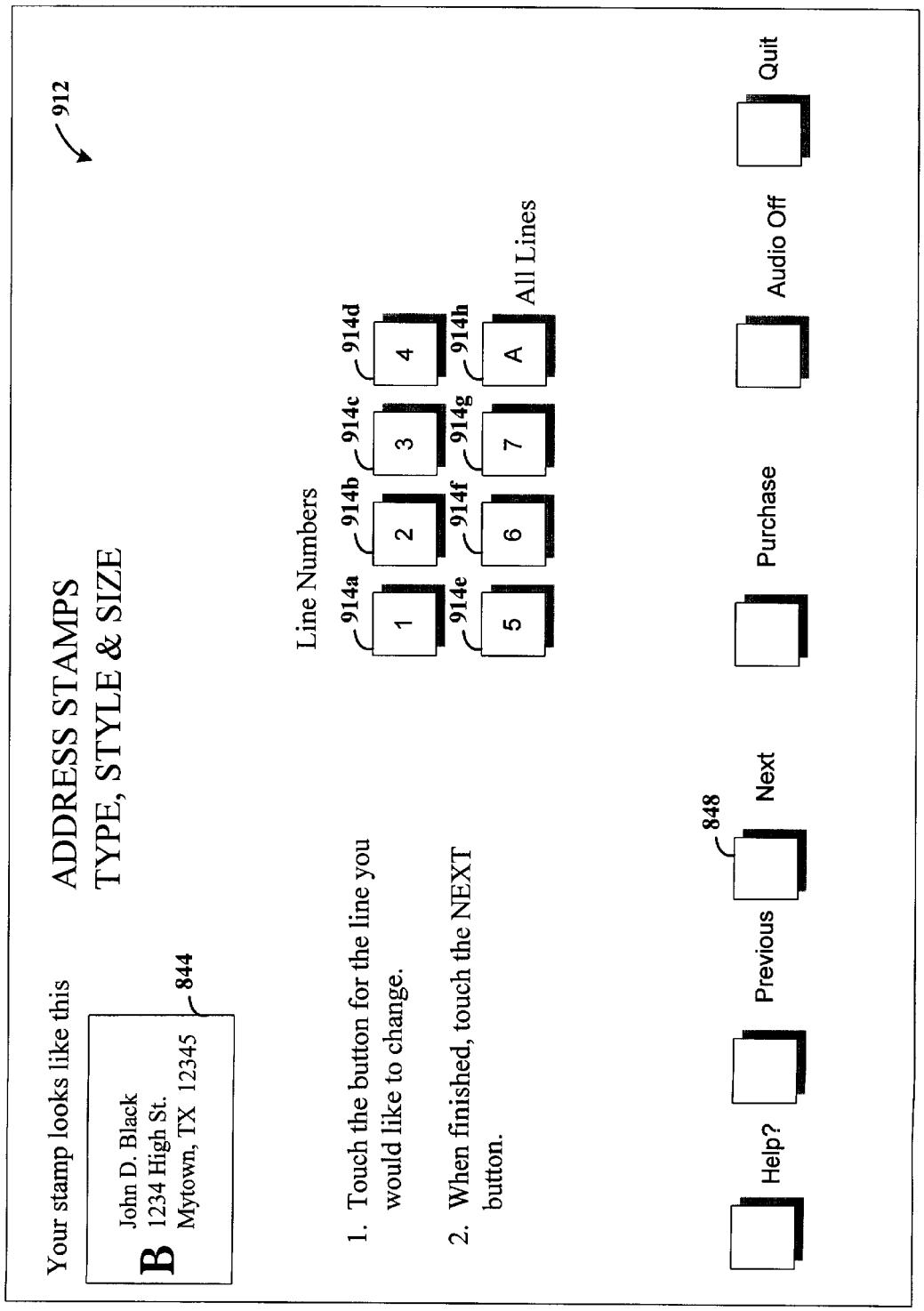
FIG. 16 is an image of an example user interface screen for customizing type style an address text.

FIG. 16 is an image of an example user interface screen for customizing type style and size of address text. To affect type style and size changes to the address text shown in box 844, the user must first specify the lines to which the changes should be made. Any combination of buttons 914*a–g* may be touched to select the lines of the address text to change. However, in the example shown, there are only three lines of address text. To apply style and size changes to all lines of the address text, the all lines button 914*h* must be touched. To continue the process of modifying the type style and size of the address text after the line numbers have been selected, the user must touch next button 848. Touching next button 848 causes kiosk computer 204 to display the user interface screen of FIG. 17 for specifying type style and sizes for the designated lines.

Figure 17:
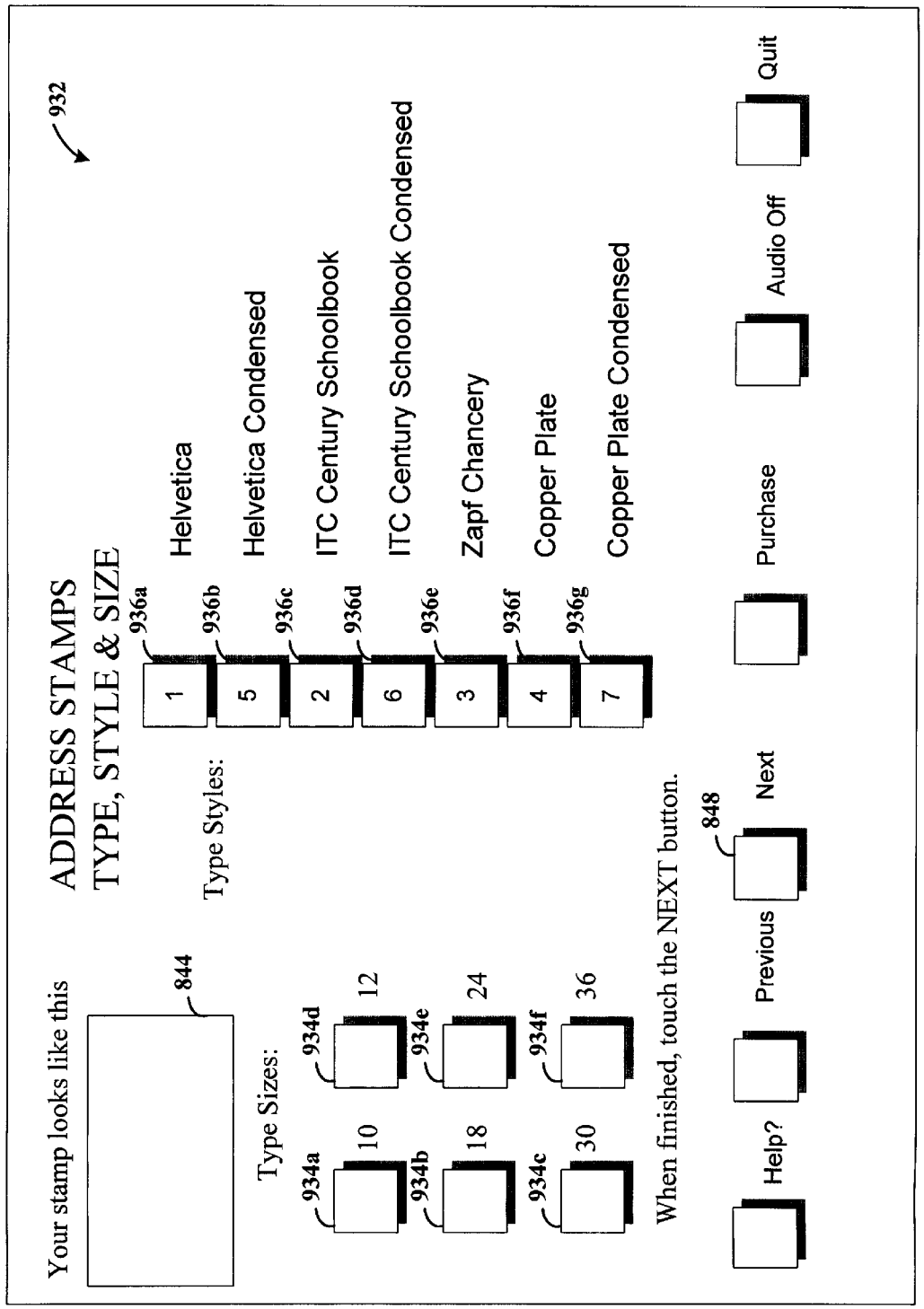
FIG. 17 is an image of an example user interface screen for selection of type style and size parameters to apply to address text.

FIG. 17 is an image of a user interface screen for selection of type style and size parameters to apply to the address text. Screen 932 includes box 844 for displaying the customized address stamp as changes to the address text are applied according to type sizes and styles selected in the user interface screen 932. Six type sizes and seven type styles are available for applying to the address text. To select a type size, the user must touch one of type size buttons 934*a–f*. The associated type sizes are displayed in the boxes beside type size buttons 934*a–f*. Type style buttons 936*a–g* are available for selecting one of the type styles illustrated in the boxes associated with type style buttons 936*a–g*. The user must touch the next button 848 after having selected a desired type size and type style to continue with customization of the address text shown in box 844. The next screen for customization of the address text is illustrated in FIG. 18.

Figure 18:
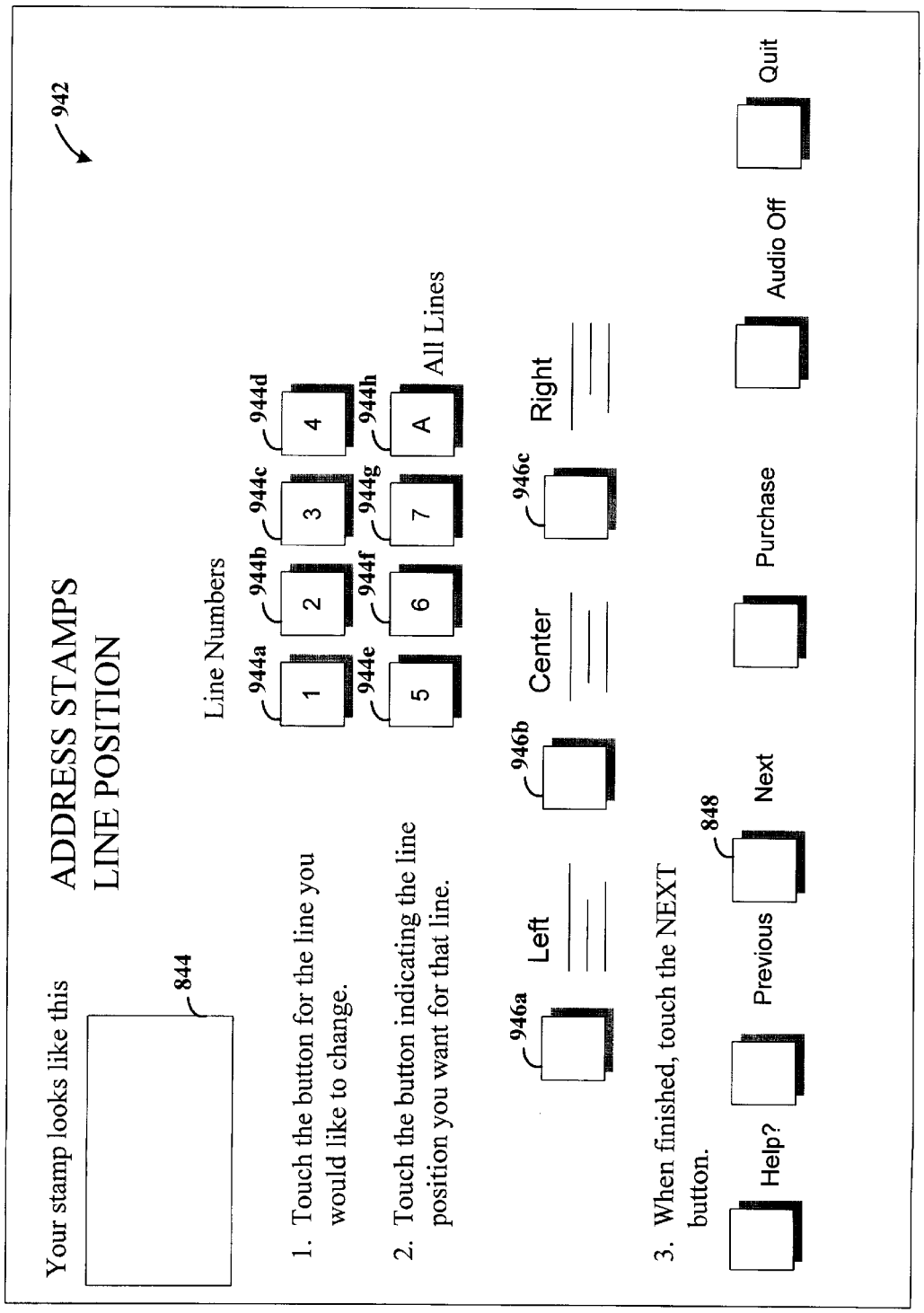
FIG. 18 is an image of an example user interface screen for modification of line positions in address text of a customized address stamp.

FIG. 18 is an image of an example user interface screen for modification of line positions in address text of a customized address stamp. Screen 942 solicits the user for specification of line numbers of the address text to be changed and the line position at which the specified lines are to be placed. Line number buttons 944*a–h* are available for the user to specify which lines of the address text are to be changed. To affect changes to individual ones of the lines of the address text, the user must touch the appropriate line number buttons 944*a–g*. To apply the desired changes to all the lines of the address text, line number button 944h must be touched. After the user has selected the lines, the user must select the desired line position. To select a line position, the user must touch one of line position buttons 946*a–c*. Line position button 946*a* must be touched for left alignment of the address text; line position button 946*b* must be touched for centering the address text; and line position button 946*c* must be touched for right alignment of the address text. After the positions of the lines have been selected, the user must touch next button 848 to continue with customization of the address stamp. The next customization option is for selecting colors for the address stamp as shown in FIG. 19.

Figure 19:
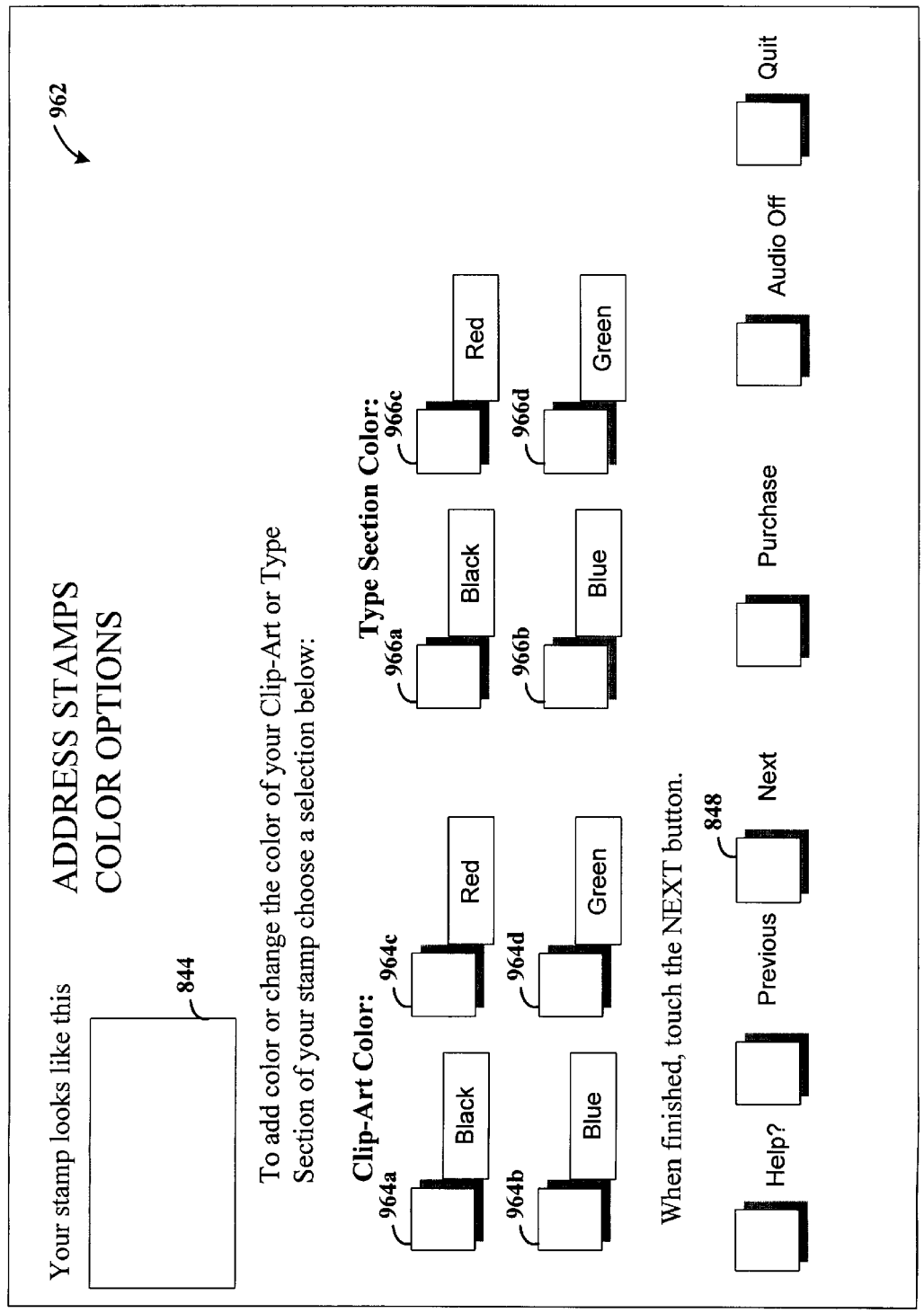
FIG. 19 is an image of an example user interface screen for selection of colored options to apply to a customized address stamp.

FIG. 19 is an image of a user interface screen for selection of color options to apply to the customized address stamp. The user may choose different colors for the clip-art portion of the address stamp and for the address text portion of the address stamp. It should be noted in this screen, that the clip-art color selected would be applied to the example monogram displayed in box 844. Screen 962 includes clip-art color button 964*a–d* and type section color buttons 966*a–d*. After the user has selected a color for the clip-art and/or a color for the address text of the address stamp, the next button 848 must be touched to continue with customization of the address stamp. The next, and last, screen for customization of the address stamp is for applying boldness, italics, and underlining formatting to the address text.

Figure 20:
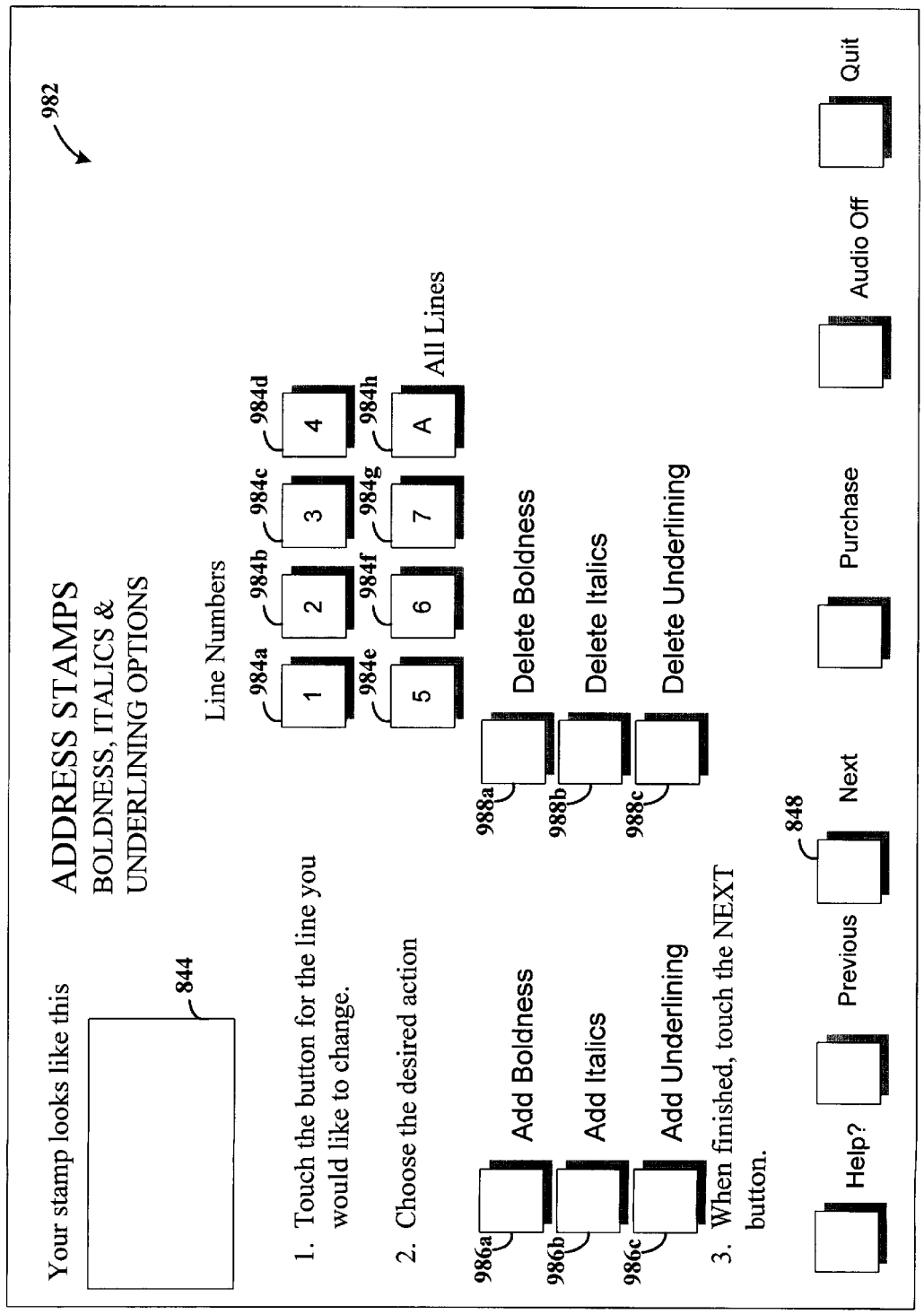
FIG. 20 is an image of an example user interface screen for specification of fullness, italics, and underlining options to the address text of an address stamp.

FIG. 20 is an image of a user interface screen for specification of boldness, italics and underlining options to the address text of an address stamp. To affect the desired customization, the user must first select the line numbers to which the customization is to be applied, and then select the desired customization of the text. Screen 982 includes line number buttons 984*a–h* for specification of the line numbers to which to apply the customization. Customization buttons 986*a–c* are available for respectively specifying boldness, italics, and underlining to apply to the address text. To apply the formatting option, the user must touch the associated button. Each of the formatting options boldness, italics, and underlining may be removed from the address text by touching the appropriate one of delete buttons 988*a–c*. As the user selects format options, the changes are reflected in the address text as displayed in the box 844. When the user is satisfied with the format of the address stamp, next button 848 must be touched to continue with the process of designing and ordering a customized imprintable medium. The next screen displayed by the kiosk computer 204 is for purchase of the customized imprintable medium.

Figure 21:
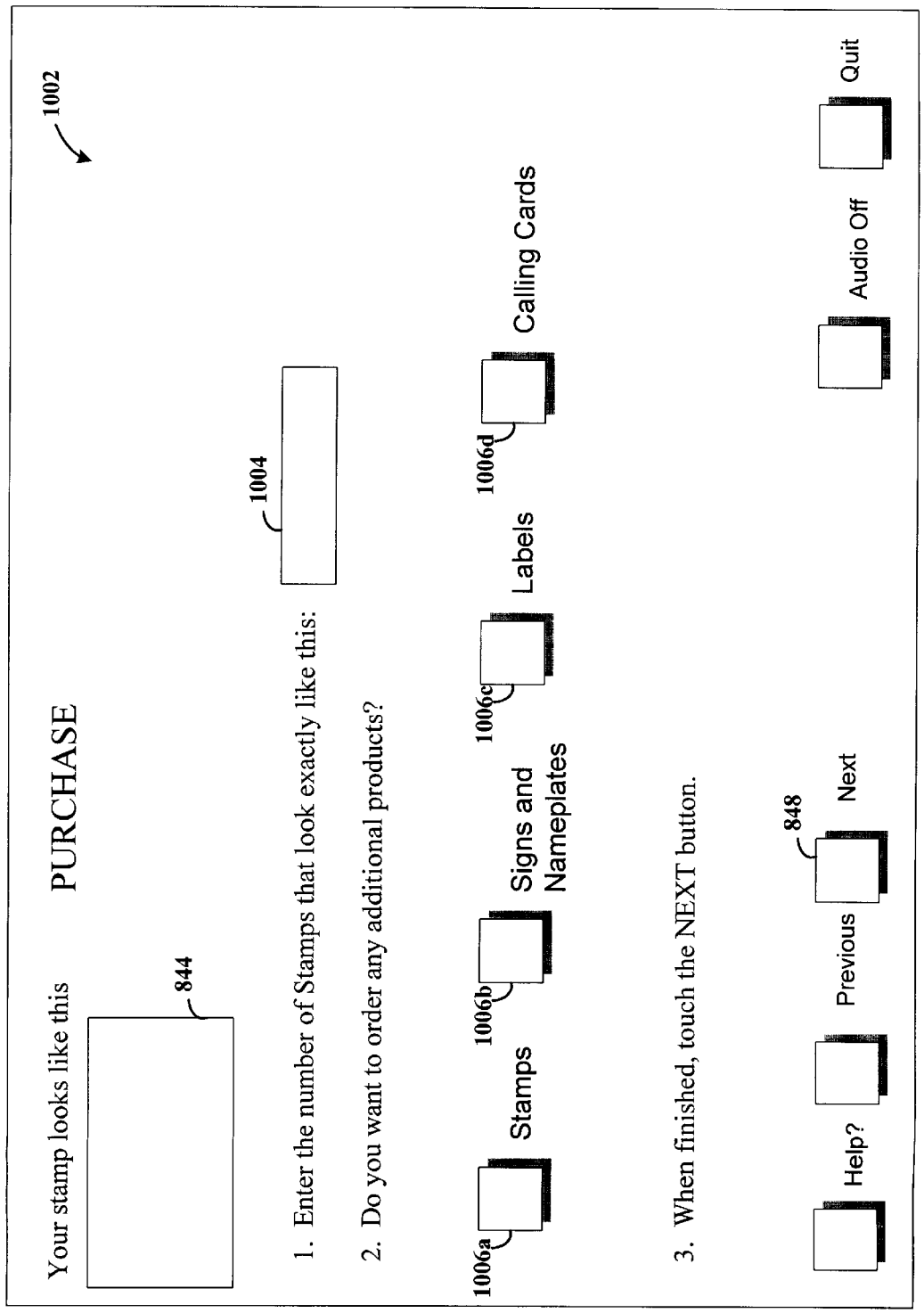
FIG. 21 is an image of an example user interface screen for initiating purchase of a customized address stamp.

FIG. 21 is an image of a user interface screen for initiating purchase of a customized address stamp. Screen 1002 directs the user to enter a quantity of address stamps desired, and also gives the user the option of creating additional customized imprintable media. The user enters the desired quantity by touching the appropriate numbers of keyboard impression 230, and kiosk computer 204 responds by displaying the entered numbers in box 1004. To create additional customized imprintable media such as stamps, signs and name plates, labels, or calling cards, the user must touch an appropriate one of buttons 1006*a–d*. In response to a user touching the next button 848 after having touched one of buttons 1006*a–d*, kiosk computer 204 displays an appropriate user interface screen for creation of the selected type of customized imprintable medium. For example, if button 1006*a* is touched, kiosk computer 204 displays the image of screen 732 of FIG. 8 on monitor 208. If the next button 848 is pushed and none of buttons 1006*a–d* have been touched, kiosk computer 204 displays an order form user interface screen for verifying order information of the customized imprintable media.

Figure 22:
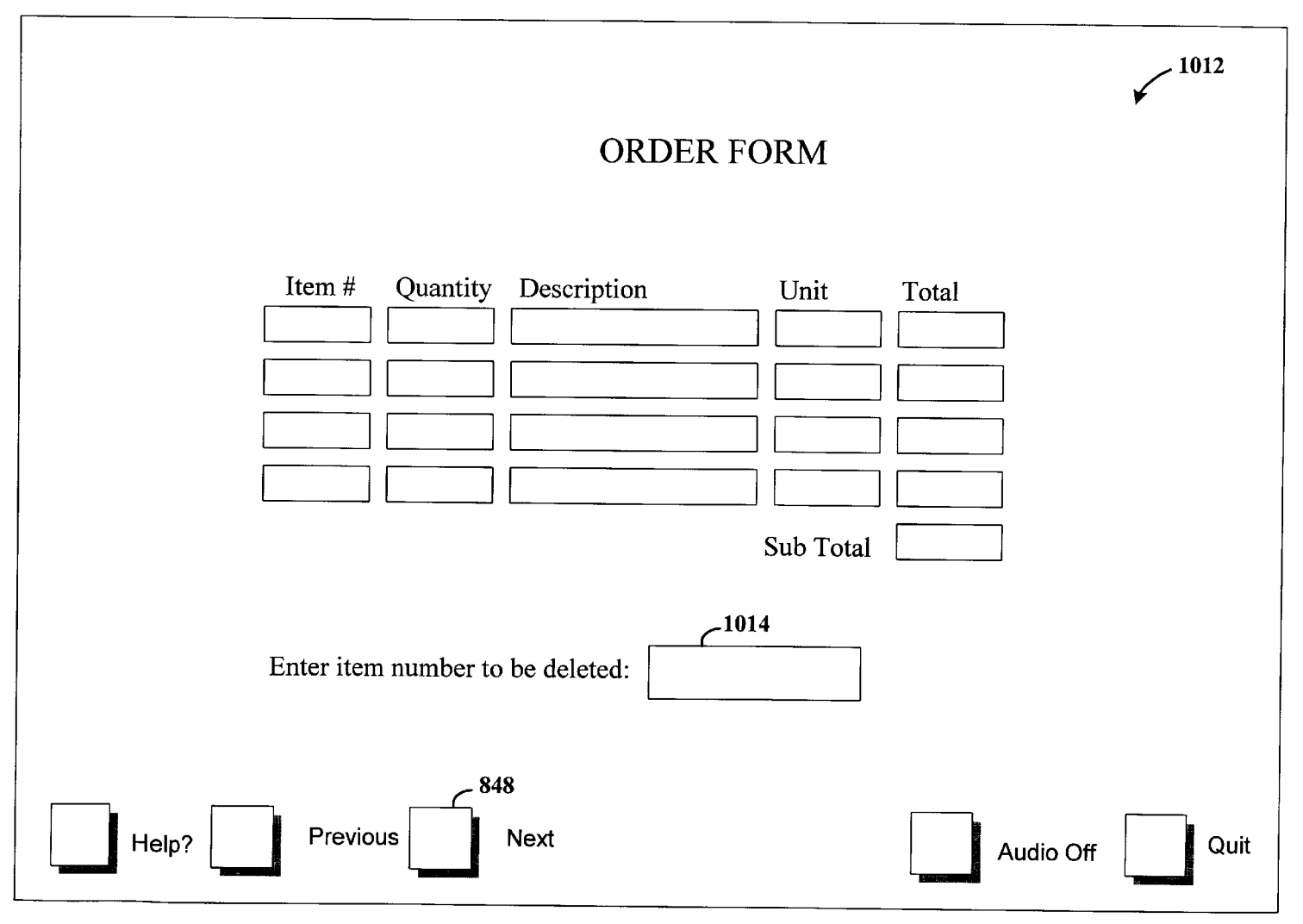

FIG. 22 is an image of a user interface screen for verifying order information for customized imprintable media. Screen 1012 includes an item number as assigned by kiosk computer 204, a quantity as input on purchase screen 1002; a description as provided by kiosk computer 204; a unit number as assigned by kiosk computer 204 and a price total for each of the customized imprintable media. The user may optionally delete one of the customized imprintable media from order screen 1012 by touching keyboard impression 230 to enter the item number of imprintable medium to delete. Kiosk computer 204 echoes the item number to delete in box 1014. Touching next button 848 causes kiosk computer 204 to display a user interface screen for entry of shipping information. It should be noted that in the interest of brevity, user interface screens for soliciting shipping information and payment information are not described herein. Therefore, discussion of order form screen 1012 completes the process for creating and ordering a customized address stamp.

In another aspect of the invention recall that a user may elect to create a custom stamp. Referring back to FIG. 8, the user has the option to create a custom stamp by touching area 748. Upon touching button 748 to create a custom stamp, kiosk computer 204 displays a user interface screen for choosing the size of a custom stamp.

Figure 23:
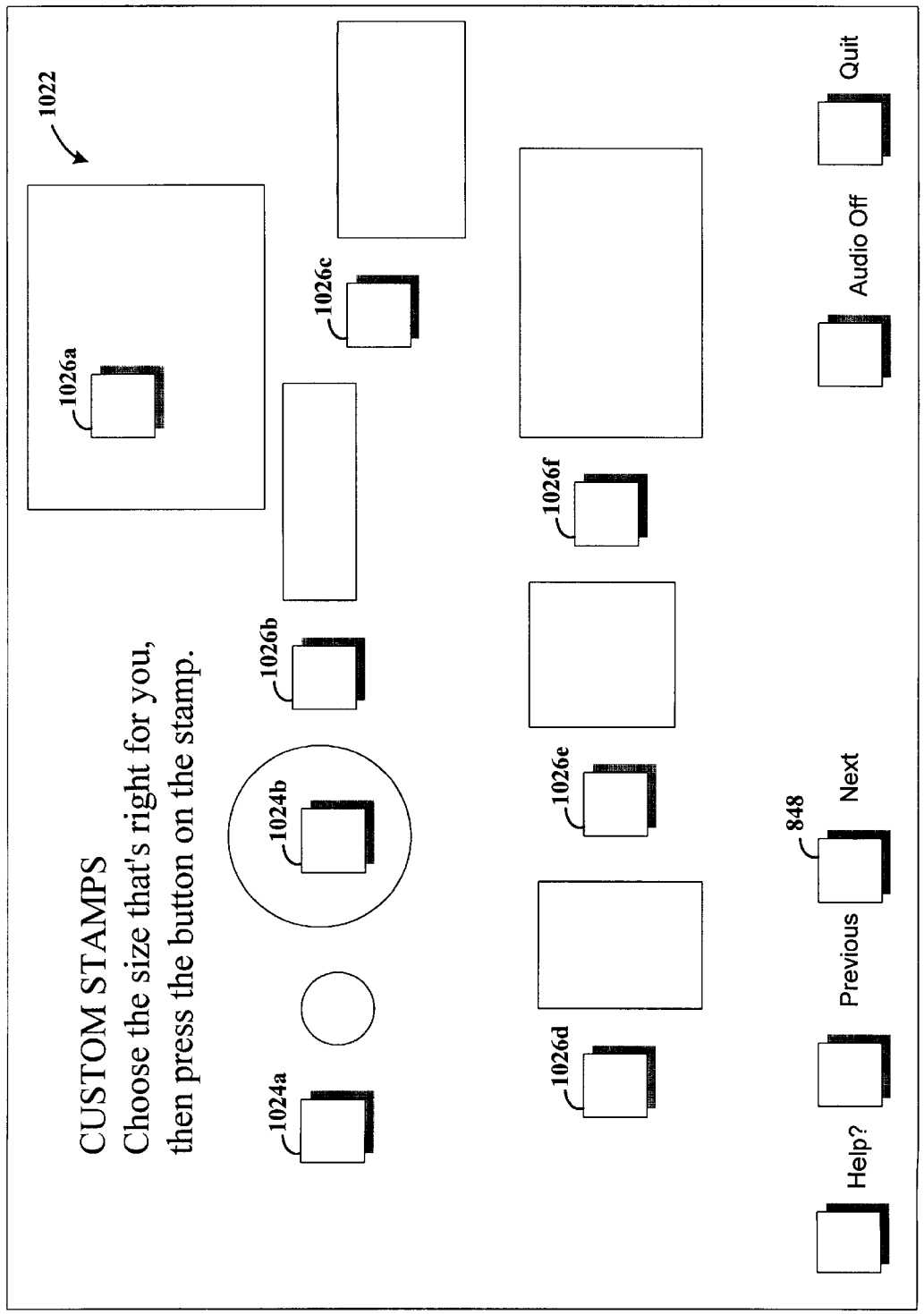
FIG. 23 is an image of an example user interface screen for selection of a size of custom stamp.

Continuing now with FIG. 23, an image is shown of an example user interface screen for selection of a size of a custom stamp. In addition to offering selection of different sizes of custom stamps, screen 1022 offers selection of different shapes for custom stamps. In particular, buttons 1024a and 1024b offer selection of different sizes of circular custom stamps, and buttons 1026a–f offer selections of different sizes of rectangular custom stamps. Responsive to a user touching one of buttons 1024a–b or buttons 1026a–f, kiosk computer 204 displays user interface screens for adding clip-art to the custom stamp. The process for adding clip-art to a custom stamp is similar to the process described along with FIGS. 10 and 11 for adding clip-art to an address stamp. Therefore, the particular screens for adding clip-art to custom stamps will not be described herein.

Figure 24:
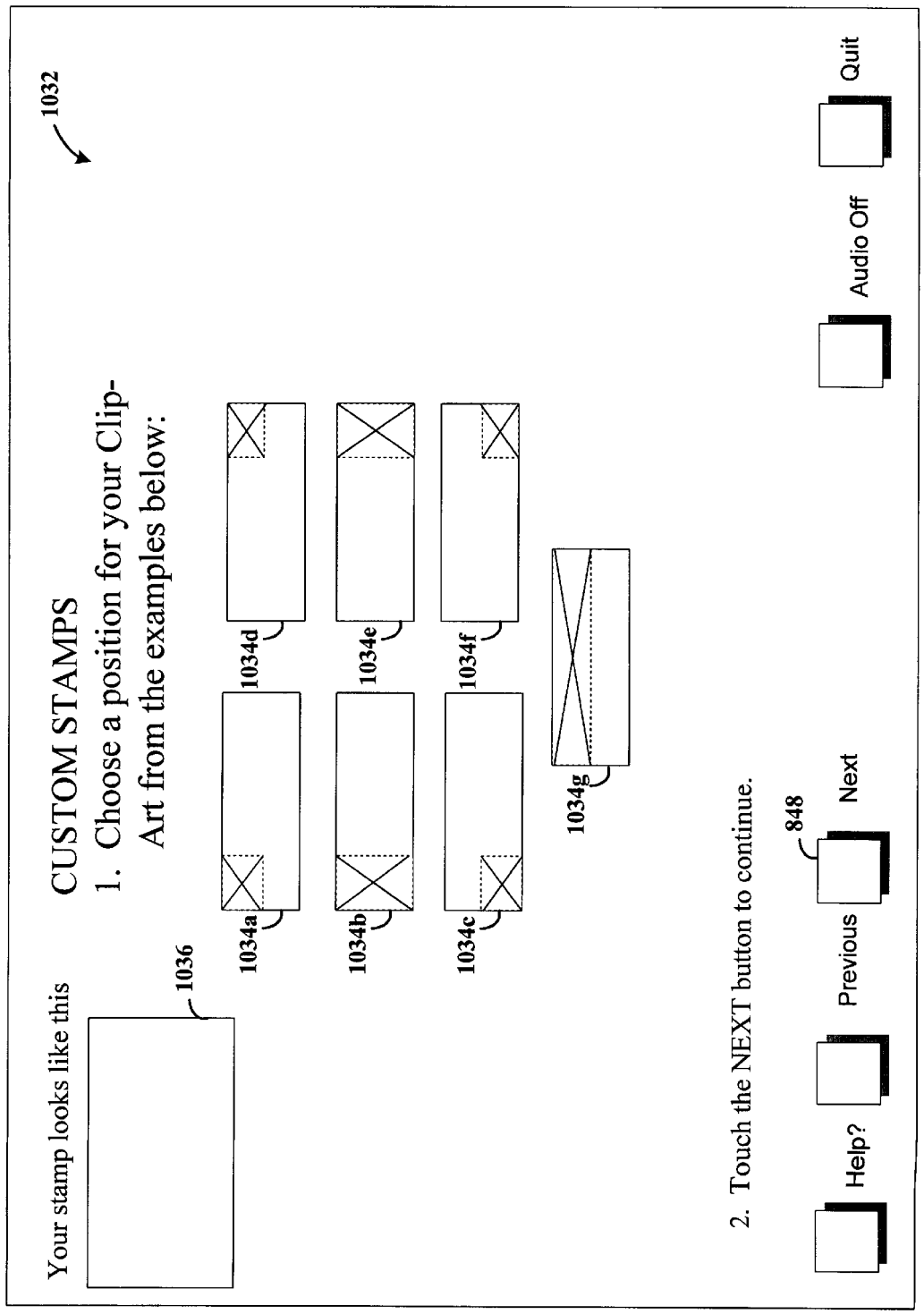
FIG. 24 is an image of an example user interface screen for positioning clipart within a custom stamp.

Continuing now with FIG. 24, a user interface screen 1032 is shown for positioning clip-art within the custom stamp. The user may select any one of seven positions as illustrated by touch boxes 1034a–g. Kiosk computer 204 updates the image in box 1036 after the user has selected the desired position (as represented by a position code). After the user is satisfied with the desired position of the clip-art in the custom stamp, the user touches next button 848 to continue with creating the custom stamp. In response, kiosk computer 204 displays an example user interface screen for entering text for the custom stamp.

Figure 25:
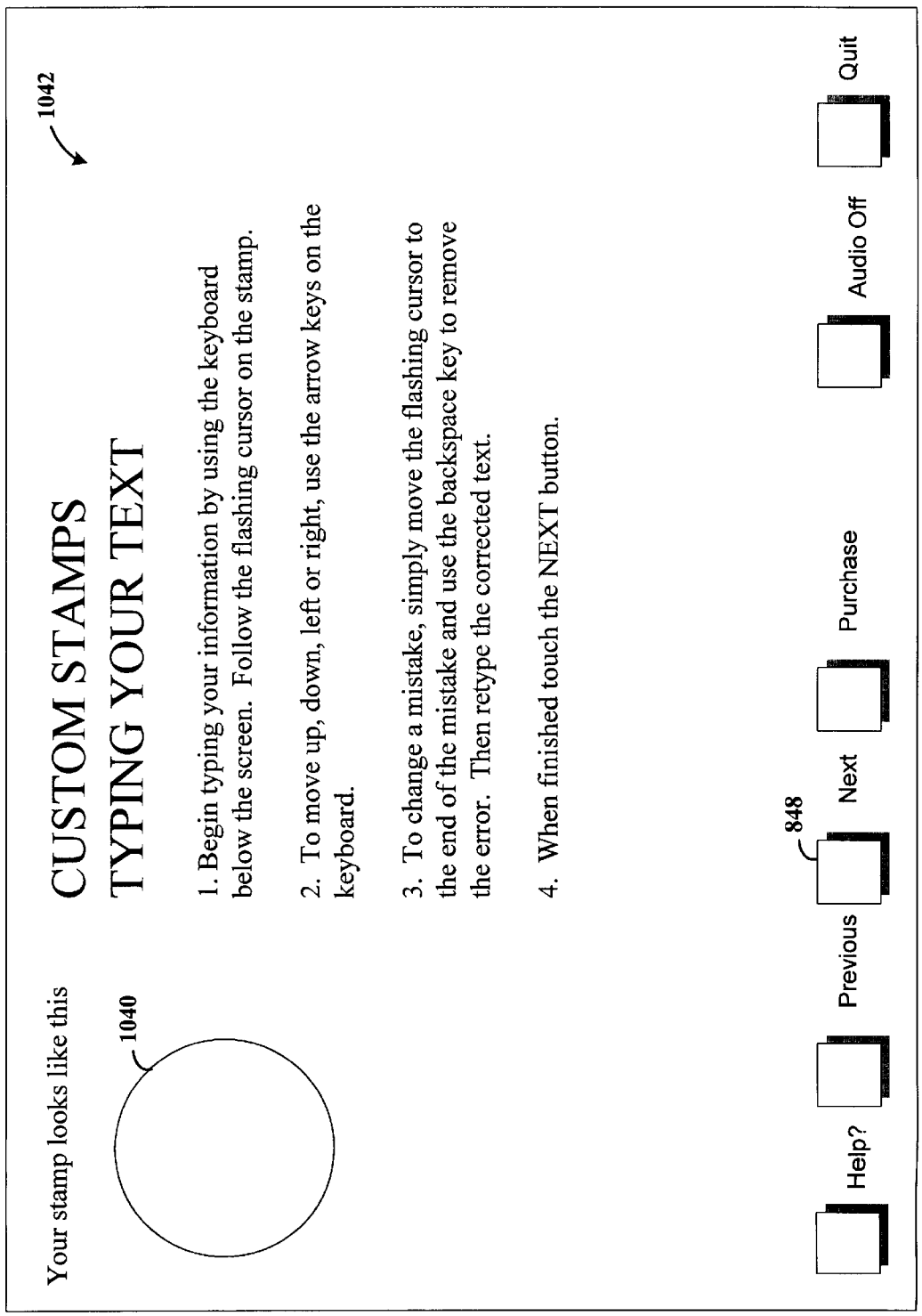
FIG. 25 is an image of an example user interface screen for entering text in a custom stamp.

FIG. 25 is an image of an example user interface screen for entering text in a custom stamp. The processing for entering text in a custom stamp is similar to the process for entering text in an address stamp, however, when the custom stamp is a circular stamp as indicated by circle 1040, kiosk computer 204 automatically aligns the entered text along a vertical margin as determined as a function of the radius of the circle 1040. As with entry of text for address stamps, kiosk computer 204 automatically sizes the text to fit the size of the shape of the custom stamp. After the user has completed entry of the text in the custom stamp, the user must touch next button 848 to complete creation of the custom stamp. In response, kiosk computer 204 displays user interface screens for formatting the text in the custom stamp similar to the user interface screens described with reference to FIGS. 15–20.

Figure 26:
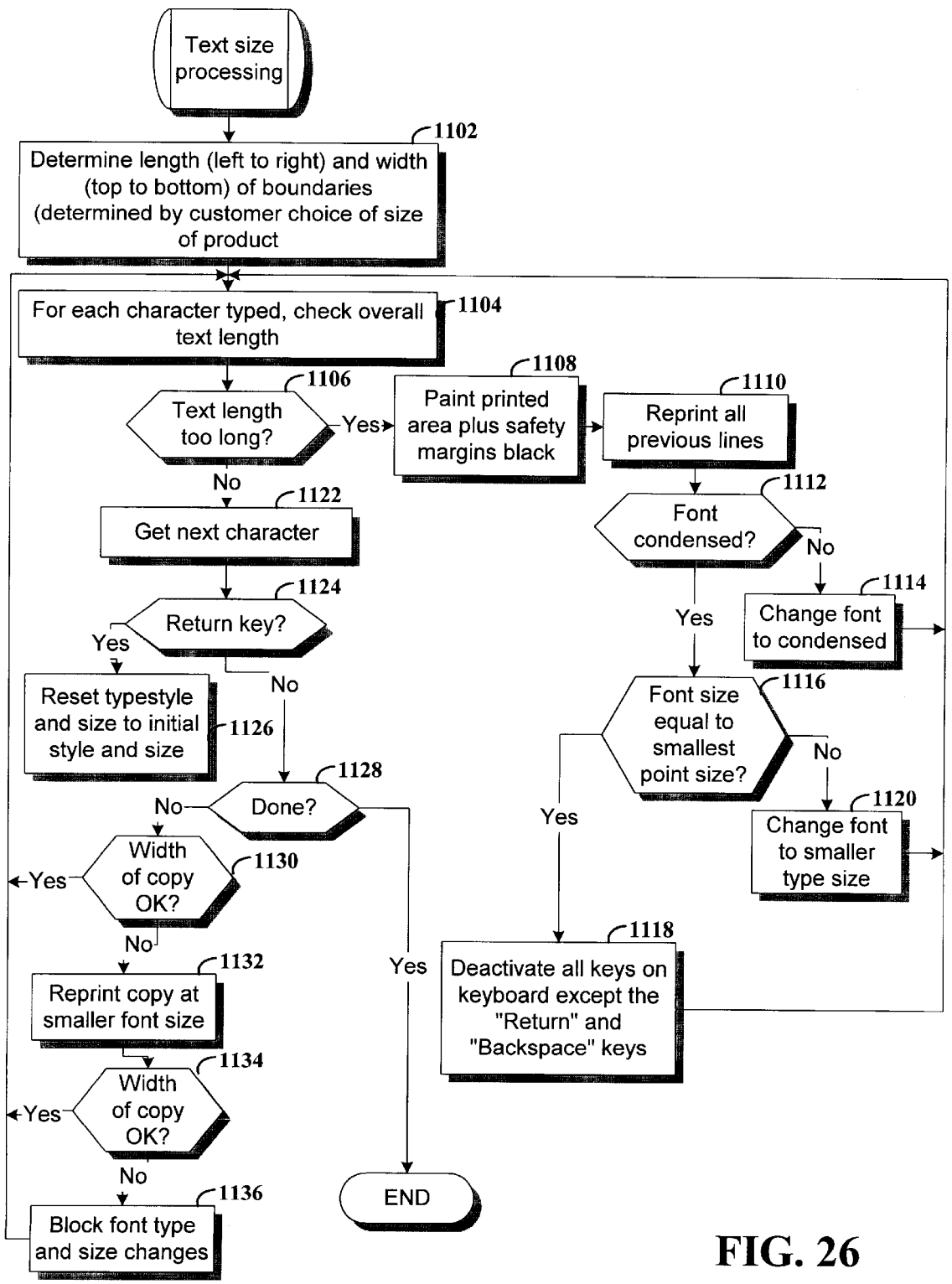
FIG. 26 is a flowchart of an example method for automatically sizing text in a customized imprintable medium.

FIG. 26 is a flowchart of an example method for automatically sizing text in a customized imprintable medium. As test is entered, the space occupied by the text is computed and the size is adjusted accordingly. Beginning with step 1102, the length and width dimensions of the customized imprintable medium are determined as specified by a user. As each character is entered, step 1104 first checks the space occupied by the text entered thus far. Decision step 1106 tests whether the text thus far entered is too long for the available space. If so, control is directed to step 1108, where the image of the customized imprintable medium is temporarily painted black until the text is resized. At step 1110, the lines entered prior to the present line are reprinted, and control is then directed to decision step 1112. Decision step 1112 tests whether the font or the present line is a condensed format. If not, control is directed to step 1114 where the font for the present line is changed to a condensed format and control is then directed back to step 1104. If the font, on the other hand, is already in a condensed format, control is directed to decision step 1116, where the size of the font for the present line is tested. If the font is already at the smallest possible size, control is directed to step 1118, where the user is denied entry of further text by deactivation of keys of the keyboard, except for the return and backspaced keys. Processing then continues at step 1104. If decision step 1116 finds that the font for the present line is not the smallest size available, control is directed to step 1120, where the font is changed to a smaller size. Processing then continues at step 1104.

Returning now to decision step 1106, if the length of the text of the present line does not exceed the specified boundaries, control is directed to step 1122 to read the next character from the keyboard. Decision step 1124 tests whether the return key was touched. If the return key is touched, control is directed to step 1126 where the type, style and size are reset to the initial type, style and size for the next line of text. Processing then is directed to step 1104.

If decision step 1124 finds that the return key was not touched, control is directed to decision step 1128 to determine whether entry of text is complete. If not, control is directed to decision step 1130. Decision step 1130 tests whether the width of the text entered by the users within the boundaries of the customized degravable medium. If so, processing continues at step 1104. Otherwise, control is directed to step 1132, where the image of the customize imprintable medium is redisplayed with a smaller font size. Processing then continues at step 1134. Decision step 1134 against tests whether the width of the text entered by the user for the customized imprintable medium is within the boundaries of the customized imprintable medium. If so, control is directed to step 1104. Otherwise, processing continues at step 1136. Step 1136 blocks font type and size changes by the user. Control is then directed to step 1104 as described above.

Figure 27:
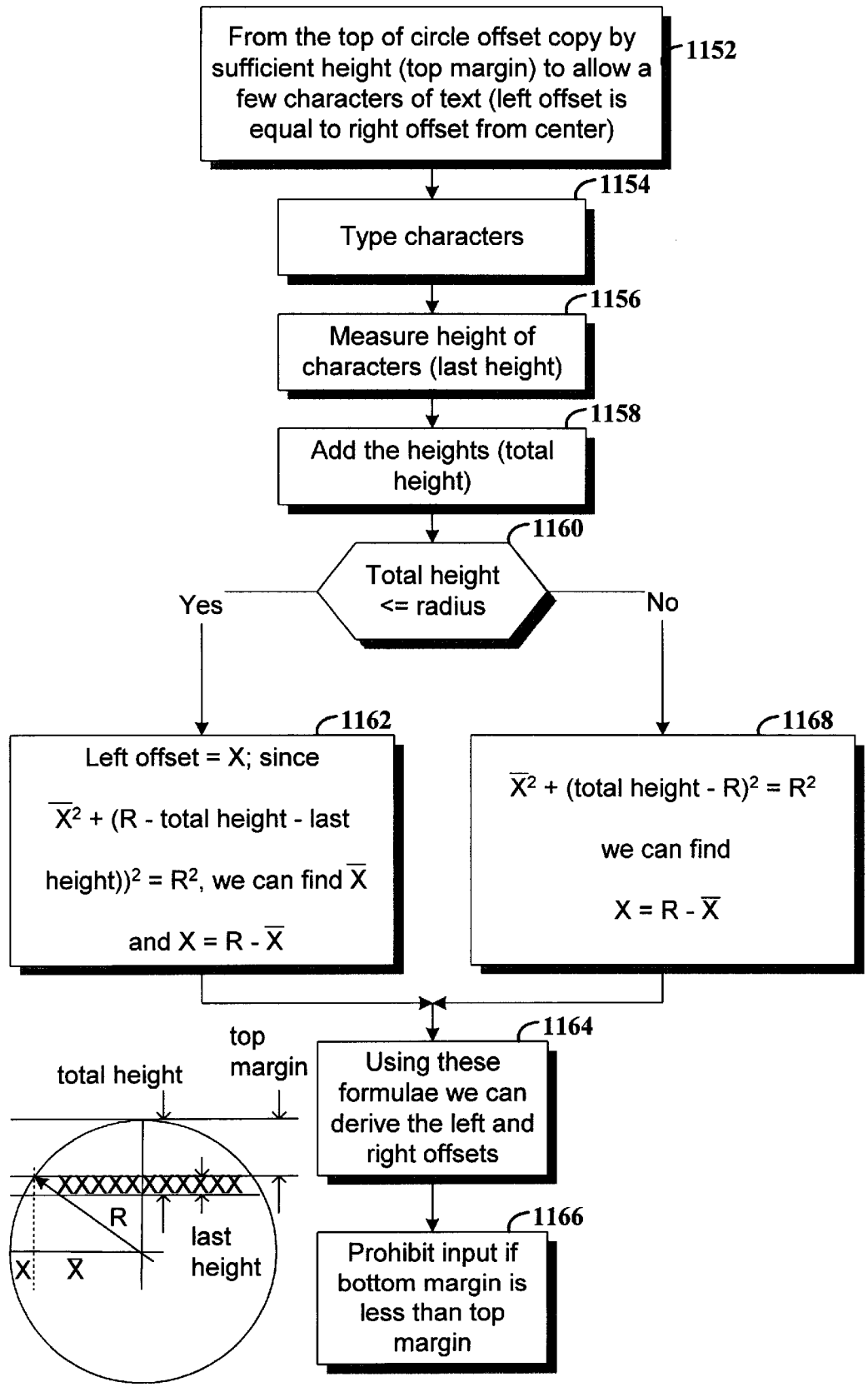
FIG. 27 is a flowchart of an example method for aligning text on a circular imprintable medium.

FIG. 27 is a flowchart of an example method for aligning text on a circular imprintable medium. Processing begins at step 1152, where a predetermined top margin is established large enough to accommodate a predetermined number of characters. At step 1154, a line of characters is entered. The height of the line of characters entered is measured at step 1156, and processing continues at step 1158 where the total height is determined, the total height being the sum of the top margin and the heights of all lines of characters thus far. Note that the height of the line of characters measured at step 1156 is referenced in the flowchart as LAST Height. Processing is then directed to decision step 1160.

If the total height calculated at step 1158 is less than or equal to the radius of the circle, decision step 1160 directs control to step 1162. Step 1162 determines the left offset relative to the left arc of the circle. Since the total height, last height and radius of the circle are known, pithagarian's theorem can be used to solve for the left offset as shown at step 1162. Processing continues at step 1164 where both the left and right offsets are determined as explained in step 1162. The last step for aligning text in a circle is step 1166, where further input of text is denied if the bottom margin is less than the top margin.

Returning now to step 1160, if the total height is greater than the radius, control is directed to step 1168. Step 1168 shows how the left and right margins may be determined when lines of text are entered in the lower half of the circle. The determination of the left and right margins as shown in step 1168 is similar to the determination of the left and right margins as shown in step 1162. However, since in the lower half of the circle, the total height is greater than the radius, the radius is subtracted from the total height as shown in step 1168. Processing then continues at step 1164 as explained above.

Appendix A is example Visual Basic code that illustrates the information and format for a custom design and order file which is transmitted from kiosk computer 204 to computer system 106.

The above specification, examples and data provide a complete description of the manufacture and use of the composition of the invention. Those skilled in the art will recognize that various other embodiments are contemplated. For example, kiosk 102 may include a computer with a Web Browser, and the various design solicitations may be downloaded from another computer in the form of HTML documents and/or applets or controls. Since many embodiments of the invention can be made without departing from the spirit and scope of the invention, the invention resides in the claims hereinafter appended.

We claim:

1. An automated method for creating and ordering custom designed imprinted media, comprising the steps of:
    reading as input at a first computer a type indicating one of a plurality of imprintable media;
    reading as input at a first computer custom design information to engrave on an imprintable medium of the type input;
    reading as input at the first computer a size code indicative of a size for the imprintable medium;
    displaying at the first computer, according to the type of imprintable medium, an image of the custom design information to appear on the imprintable medium;
    reading as input at the first computer order information; and
    automatically transmitting the type of imprintable medium, custom design information, size code, and order information to a second computer.

2. The method of claim 1, further comprising the steps of:
    reading as input text codes indicative of text to engrave on the imprintable medium; and
    automatically selecting a size for the text relative to quantity of the text and the size indicated by the size code.

3. The method of claim 1, further comprising the steps of:
    reading as input at the first computer a clip-art image code indicative of one of a plurality of clip-art images to engrave on the imprintable medium; and
    automatically transmitting the image code to the second computer.

4. The method of claim 3, further comprising the steps of:
    reading as input at the first computer a position code indicative of a position at which the one of the plurality of clip-art images is to be imprinted; and
    automatically transmitting the position code to the second computer.

5. The method of claim 1, further comprising the steps of:
    reading as input at the first computer a shape code indicative of one of a plurality of shapes for the imprintable medium; and
    automatically transmitting the shape code to the second computer.

6. The method of claim 5, further comprising the steps of:
    reading as input text codes indicative of text to engrave on the imprintable medium; and
    automatically aligning the text relative to quantity of the text and the shape indicated by the shape code; and
    automatically transmitting the text codes and alignment information to the second computer.

7. The method of claim 6, wherein the plurality of shapes includes a circle and a rectangle.

8. The method of claim 1, further comprising the step of reading as input at the first computer a color code indicative of a color to apply to a design on the imprintable medium.

9. The method of claim 1, further comprising the step of reading as input text codes indicative of text to engrave on the imprintable medium.

10. The method of claim 9, further comprising the step of reading as input format parameters indicative of formatting to apply to the text.

11. The method of claim 1, further comprising the step of accumulating order information for a plurality of orders at the first computer; and
    wherein the transmitting step includes the step of, periodically initiating, at the second computer, transfer of the order information for the plurality of orders from the first computer to the second computer.

12. An automated method for creating and ordering custom designed imprinted media, comprising the steps of:
    reading from a touchscreen as input at a first computer a type of imprintable medium;
    reading from a touchscreen as input at a first computer custom design information to engrave on an imprintable medium of the type input;
    reading as input at the first computer a size code indicative of a size for the imprintable medium;
    displaying at the first computer, according to the type of imprintable medium, an image of the custom design information imprinted on the imprintable medium;
    reading from a touchscreen as input at the first computer order information; and
    automatically transmitting the type of imprintable medium, custom design information, size code, and order information to a second computer.

13. A system for creating and ordering custom designed imprinted media, comprising:
    means for reading as input at a first computer a type indicating one of a plurality of imprintable media;
    means for reading as input at a first computer custom design information to engrave on an imprintable medium of the type input;
    means for reading as input at the first computer a size code indicative of a size for the imprintable medium;
    means for displaying at the first computer, according to the type of imprintable medium, an image of the custom design information to appear on the imprintable medium;
    means for reading as input at the first computer order information; and
    means for automatically transmitting the type of imprintable medium, custom design information, size code, and order information to a second computer.

14. A system for creating and ordering custom designed imprinted media, comprising:
    a first plurality of computers, each configured and arranged to input a type indicating one of a plurality of imprintable media, custom design information to engrave on an imprintable medium of the type input, a size code indicative of a size for the imprintable medium, and order information, and display an image of the custom design information to appear on the imprintable medium;
    a plurality of monitors coupled to the first plurality of computers, each for displaying an image from one of the first plurality of computers;
    a second computer coupled to the first plurality of computers and configured and arranged to download the custom design information, size code, and order information from the first plurality of computers.

15. The system of claim 14, further comprising:
    a plurality of touchscreen controllers coupled to the first computers; and a plurality of touchscreens coupled to the touchscreen controllers, each having a keyboard portion and a transparent portion through which the monitor is visible.

16. A system for creating and ordering custom designed imprinted media, comprising:
a computer configured and arranged to,
read as input a type indicating one of a plurality of imprintable media;
read as input custom design information to engrave on an imprintable medium of the type input;
read as input at the first computer a size code indicative of a size for the imprintable medium;
display, according to the type of imprintable medium, an image of the custom design information to appear on the imprintable medium;
read as input order information; and
automatically transmit the type of imprintable medium, custom design information, size code, and order information to a second computer.

* * * * *